United States Patent [19]

Tsutsui et al.

[11] Patent Number: 5,145,818
[45] Date of Patent: * Sep. 8, 1992

[54] OLEFIN POLYMERIZATION CATALYST AND PROCESS FOR THE POLYMERIZATION OF OLEFINS

[75] Inventors: Toshiyuki Tsutsui; Kenji Sugimura; Takashi Ueda, all of Kuga, Japan

[73] Assignee: Mitsui Petrochemical Industries, Ltd., Tokyo, Japan

[*] Notice: The portion of the term of this patent subsequent to Jun. 9, 2009 has been disclaimed.

[21] Appl. No.: 631,428

[22] Filed: Dec. 21, 1990

[30] Foreign Application Priority Data

Dec. 29, 1989 [JP] Japan .................. 1-340912
Dec. 29, 1989 [JP] Japan .................. 1-340915
Dec. 29, 1989 [JP] Japan .................. 1-340918

[51] Int. Cl.$^5$ .................. C08F 4/653; C08F 4/646
[52] U.S. Cl. .................. 502/113; 502/108; 502/117; 526/114; 526/116; 526/119
[58] Field of Search .................. 502/108, 113, 117

[56] References Cited

U.S. PATENT DOCUMENTS 4,295,991 10/1981 Wristers .................. 502/108 X
4,659,685 4/1987 Coleman et al. .................. 502/113
4,701,432 10/1987 Welborn .................. 502/113

FOREIGN PATENT DOCUMENTS 277003 8/1988 European Pat. Off. .................. 502/103
277004 8/1988 European Pat. Off. .................. 502/103

Primary Examiner—Patrick P. Garvin
Attorney, Agent, or Firm—Sherman and Shalloway

[57] ABSTRACT

In accordance with the present invention, there are provided olefin polymerization catalysts comprising
[A] a titanium catalyst component containing titanium, magnesium and halogen as its essential ingredients,
[B-1] a transition metal compound containing a ligand having a cycloalkadienyl skeleton,
[C] an organoaluminum oxy-compound and, if necessary,
[D] an organoaluminum compound.

Further, in accordance with the invention, there are provided olefin polymerization catalysts comprising
[A] a titanium catalyst component containing titanium, magnesium and halogen as its essential ingredients,
[B-2] a transition metal compound containing a ligand having a cycloalkadienyl skeleton and an anion compound containing boron, and
[C] an organoaluminum compound and/or an organoaluminum oxy-compound.

6 Claims, 2 Drawing Sheets

* peaks based on nujol

OLEFIN POLYMERIZATION CATALYST AND PROCESS FOR THE POLYMERIZATION OF OLEFINS

FIELD OF THE INVENTION

This invention relates to olefin polymerization catalyst and process for the polymerization of olefins using said catalyst, and more particularly to novel olefin polymerization catalysts having excellent polymerization activities and capable of giving olefin (co)polymers having a broad molecular weight distribution and to a process for the polymerization of olefins using said catalysts.

BACKGROUND OF THE INVENTION

It has heretofore been known that titanium based catalysts composed of a titanium compound and an organoaluminum compound are used as catalysts for the preparation of α-olefin polymers, for example, ethylene polymers or ethylene/α-olefin copolymers.

Generally, olefin polymers obtained with the titanium based catalysts have a broad molecular weight distribution and a broad composition distribution in particular and are poor in surface non-tackiness and transparency.

On the one hand, there have been proposed recently processes for the preparation of ethylene/α-olefin copolymers using catalysts composed of zirconium compounds and aluminoxanes as new type of Ziegler catalysts for olefin polymerization.

PCT L-O-P Publns. Nos. 501950/1989 and 502036/1989 disclose processes for the preparation of transition metal compound catalysts containing ligands having a cycloalkadienyl skeleton and anions containing elementary boron, and teach that the catalysts exhibit activities in olefin polymerization.

Olefin polymers obtained with the above-mentioned new type of Ziegler catalysts for olefin polymerization usually have a narrow molecular weight distribution and a narrow composition distribution. On this account, olefin polymers which have a broad molecular weight distribution according to the purposes for which they are used and which are excellent in moldability have ardently been desired.

Further, it is difficult to obtain olefin polymers having a high molecular weight by polymerization or copolymerization of olefins in the presence of transition metal compound catalysts containing ligands having a cycloalkadienyl skeleton. Accordingly, it has been desired that transition metal compound catalysts containing ligands having a cycloalkadienyl skeleton which are capable of giving olefin polymers having a high molecular weight be developed to make their appearance.

OBJECT OF THE INVENTION

The present invention has been accomplished in light of the prior art as mentioned above, and an object of the invention is to provide olefin polymerization catalysts having excellent polymerization activities and capable of giving olefin (co)polymers which are well balanced between such physical properties as broad molecular weight distribution, excellent moldability and narrow composition distribution, and a process for the polymerization of olefins using said catalysts.

SUMMARY OF THE INVENTION

The first olefin polymerization catalyst of the present invention is characterized by comprising

[A] a titanium catalyst component containing titanium, magnesium and halogen as its essential ingredients,

[B-1] a transition metal compound containing a ligand having a cycloalkadienyl skeleton,

[C] an organoaluminum oxy-compound, and, if necessary,

[D] an organoaluminum compound.

The second olefin polymerization catalyst of the invention is characterized in that the catalyst is formed by pre-polymerization of olefin in a suspension containing

[A] a solid titanium catalyst component containing titanium, magnesium and halogen as its essential ingredients,

[B-1] a transition metal compound containing a ligand having a cycloalkadienyl skeleton,

[C] an organoaluminum oxy-compound and, if necessary,

[D] an organoaluminum compound.

The third olefin polymerization catalyst of the invention is characterized by comprising (I) A solid catalyst formed by pre-polymerization of olefin in a suspension containing

[A] a solid titanium catalyst component containing titanium, magnesium and halogen as its essential ingredients,

[B-1] a transition metal compound containing a ligand having a cycloalkadienyl skeleton,

[C] an organoaluminum oxy-compound and, if necessary,

[D] an organoaluminum compound, and (II) [C] an organoaluminum oxy-compound and/or [D] an organoaluminum compound.

The fourth olefin polymerization catalyst of the invention is characterized by comprising

[A] a titanium catalyst component containing titanium, magnesium and halogen as its essential ingredients,

[B-2] a transition metal compound containing a ligand having a cycloalkadienyl skeleton and an anion containing an elementary boron, and

[C] an organoaluminum oxy-compound and/or [D] an organoaluminum compound.

The polymerization catalysts of the present invention as illustrated above may contain olefins which have been pre-polymerized.

The fifth olefin polymerization catalyst of the invention is characterized by comprising (I) a solid catalyst component formed by pre-polymerization of olefin in a suspension containing

[A] a titanium catalyst component containing titanium, magnesium and halogen as its essential ingredients,

[B-2] a transition metal compound containing a ligand having a cyclopentadienyl skeleton and an anion containing elementary boron, and (II) [C] an organoaluminum oxy-compound and/or [D] an organoaluminum compound.

The process for the polymerization of olefins of the present invention is characterized by polymerizing or copolymerizing the olefins in the presence of the olefin polymerization catalysts as illustrated above.

The olefin polymerization catalysts of the invention have excellent polymerization activities and are capable of giving high molecular weight olefin (co)polymers having a broad molecular weight distribution and excellent in moldability.

DETAILED DESCRIPTION OF THE INVENTION

The olefin polymerization catalysts of the present invention and the process for the polymerization of olefins using said olefin polymerization catalysts are illustrated below in detail.

In the present invention, the term "polymerization" is sometimes used in a sense that it includes not only homopolymerization but also copolymerization, and also the term "polymer" is sometimes used in a sense that it includes not only homopolymer but also copolymer.

The first olefin polymerization catalyst of the invention comprises

[A] a titanium catalyst component containing titanium, magnesium and halogen as essential ingredients,

[B-1] a transition metal compound containing a ligand having a cycloalkadienyl skeleton,

[C] an organoaluminum oxy-compound and, if necessary,

[D] an organoaluminum compound.

First, the titanium catalyst component as mentioned in [A] above is illustrated. This titanium catalyst component [A] contains titanium, magnesium and halogen as its essential ingredients, and it further contains, if necessary, an electron donor.

The above-mentioned titanium catalyst component [A] may be prepared by bringing a magnesium compound, a titanium compound and, if necessary, an electron donor into contact with one another.

Titanium compound useful for the preparation of the titanium catalyst component [A] includes tetravalent titanium compounds usually represented by the formula $Ti(OR)_gX_{4-g}$ (wherein R is a hydrocarbon group, X is halogen, and $0 \leq g \leq 4$). More particularly, these titanium compounds include titanium tetrahalides such as $TiCl_4$, $TiBr_4$, and $TiI_4$; alkoxytitanium trihalides such as $Ti(OCH_3)Cl_3$, $Ti(OC_2H_5)Cl_3$, $Ti(O\ n-C_4H_9)Cl_3$, $Ti(O\ iso-C_4H_9)Cl_3$, $Ti(OC_2H_5)Br_3$, and $Ti(O\ iso-C_4H_9)Br_3$; alkoxytitanium dihalides such as $Ti(OCH_3)_2Cl_2$, $Ti(OC_2H_5)_2Cl_2$, $Ti(O\ n-C_4H_9)_2Cl_2$, and $Ti(OC_2H_5)_2Br_2$; trialkoxytitanium monohalides such as $Ti(OCH_3)_3Cl$, $Ti(OC_2H_5)_3Cl$, $Ti(O\ n-C_4H_9)_3Cl$ and $Ti(OC_2H_5)_3Br$; and tetraalkoxytitanium such as $Ti(OCH_3)_4$, $Ti(OC_2H_5)_4$, $Ti(O\ n-C_4H_9)_4$, $Ti(O\ iso-C_4H_9)_4$ and $Ti(O\ 2\text{-ethylhexyl})_4$.

Of the useful titanium compounds as exemplified above, preferred are halogen containing titanium compounds, in particular, titanium tetrahalides and especially titanium tetrachloride. These titanium compounds may be used either singly or in admixture of two or more, and also they may be diluted, before use, with hydrocarbon compounds or halogenated hydrocarbon compounds.

Further, trivalent titanium compounds such as $TiCl_3$ may be used.

Magnesium compounds useful for the preparation of the titanium catalyst component [A] in the present invention include those having reducing ability and those having no reducing ability.

The magnesium compounds having reducing ability as referred to herein include, for example, those having a magnesium-carbon bond or magnesium-hydrogen bond. Concrete examples of such magnesium compounds as having reducing ability include dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butyl ethoxy magnesium, ethyl butyl magnesium, octyl butyl magnesium, butylmagnesium halide, etc. The magnesium compounds exemplified above may be used singly, or may form complex compounds with organoaluminum compounds as will be mentioned later, and they also may be either liquid or solid.

Concrete examples of magnesium compounds having no reducing ability include halogenated magnesium such as magnesium chloride, magnesium bromide, magnesium iodide or magnesium fluoride; alkoxy magnesium halide such as methoxy magnesium chloride, ethoxy magnesium chloride, isopropoxy magnesium chloride, butoxy magnesium chloride or octoxy magnesium chloride; aryloxy magnesium halide such as phenoxy magnesium chloride or methylphenoxy magnesium halide; alkoxy magnesium such as ethoxy magnesium, isopropoxy magnesium, butoxy magnesium, n-octoxy magnesium or 2-ethylhexoxy magnesium; aryloxy magnesium such as phenoxy magnesium or dimethylphenoxy magnesium; and magnesium carboxylate such as magnesium laurate or magnesium stearate.

The magnesium compounds having no reducing ability exemplified above may be compounds derived from the above-mentioned magnesium compounds having reducing ability or compound derived at the time of preparation of catalyst component. The magnesium compound having no reducing ability may be derived from the magnesium compounds having reducing ability, for example, by bringing said magnesium compounds having reducing ability into contact with polysiloxane compounds, halogen containing silane compounds, halogen containing aluminum compounds or compounds such as esters, alcohols, etc.

The magnesium compounds used in the present invention may also be complex or composite compounds of the above-mentioned magnesium compounds with other metals, or mixtures thereof. Further, the magnesium compounds used herein may also be mixtures of two or more of these compounds mentioned above.

Of these magnesium compounds exemplified above, preferred are those having no reducing ability, particularly halogen containing magnesium compounds. Of the halogen containing magnesium compounds, preferred are magnesium chloride, alkoxy magnesium halide and aryloxy magnesium halide.

In preparing the titanium catalyst component [A], it is preferable to use an electron donor. Useful electron donors include alcohols, amines, amides, ethers, ketones, esters, nitriles, phosphines, stibines, arsines, phosphoramides, thioethers, thioesters, acid anhydrides, acid halides aldehydes, alcoholates, alkoxy(aryloxy)silanes and organic acids. Of these electron donors exemplified above, preferred are alcohols, amines, ethers, esters, acid anhydrides, alkoxy(aryloxy)silanes and organic acids.

The titanium catalyst component [A] may be prepared by bringing the above-mentioned magnesium compound (or metallic magnesium), titanium compound and, if necessary, electron donor into contact with one another. In preparing the titanium catalyst components, there may be employed the known method for the preparation of highly active titanium catalyst components from magnesium compounds, titanium compounds and, if necessary, electron donors. The above-mentioned components may be brought into contact with one another in the presence of other reaction reagents, for example, silicon, phosphorus and aluminum.

Briefly illustrated below are several examples of the process for the preparation of these titanium catalyst components.

In the following processes for the preparation of the titanium catalyst component [A] as will be illustrated below, the electron donor is used, but the use of the electron donor is not always necessary.

(1) A process wherein a magnesium compound or a complex compound comprising the magnesium compound and electron donor is allowed to react with the titanium compound in the liquid phase. In carrying out this reaction, each reactant may be pretreated with a reaction assistant such as the electron donor and/or an organoaluminum compound or a halogen containing silicon compound. In this process, the above-mentioned electron donor is used at least one time.

(2) A process wherein a liquid magnesium compound having no reducing ability is allowed to react with a liquid titanium compound in the presence of an electron donor, thereby separating out a solid magnesium titanium composite.

(3) A process wherein the reaction product obtained in the process (2) is allowed to react further with a titanium compound.

(4) A process wherein the reaction product obtained in the process (1) or (2) is allowed to react further with an electron donor and a titanium compound.

(5) A process wherein a solid product obtained by pulverizing a magnesium compound or a complex compound comprising a magnesium compound and an electron donor in the presence of a titanium compound is treated with any of halogen, a halogen compound and an aromatic hydrocarbon. In carrying out this process, the magnesium compound or the complex compound comprising the magnesium compound and the electron donor may be pulverized in the presence of a pulverized assistant. Further, after pulverizing the magnesium compound or the complex compound comprising the magnesium compound and the electron donor in the presence of the titanium compound, the solid product obtained thereby is pretreated with a reaction assistant, followed by treatment with halogen or the like. The reaction assistant used herein includes an organoaluminum compound or a halogen containing silicon compound. In this process, the electron donor is used at least one time.

(6) A process wherein the compound obtained in the processes (1)-(4) is treated with halogen, a halogen compound or an aromatic hydrocarbon.

(7) A process wherein a contact reaction product of a metallic oxide with dihydrocarbyl magnesium and a halogen containing alcohol is brought into contact with an electron donor and a titanium compound.

(8) A process wherein a magnesium compound such as magnesium salt of an organic acid, alkoxy magnesium or aryloxy magnesium is allowed to react with an electron donor, a titanium compound and/or a halogen containing hydrocarbon.

(9) A process wherein a catalyst component contained in a hydrocarbon solution at least comprising a magnesium compound, alkoxy titanium and/or an electron donor such as alcohol or ether are allowed to react with a titanium compound and/or a halogen containing compound such as a halogen containing silicon compound.

(10) A process wherein a liquid magnesium compound having no reducing ability is allowed to react with an organoaluminum compound to separate a solid magnesium aluminum composite, followed by reaction with a titanium compound.

Of the above-mentioned processes (1) to (10) for the preparation of the titanium catalyst component [A], preferred are the processes (1) to (4) and (10).

Further, a mixed solution of a liquid magnesium compound having no reducing ability and a titanium compound may also be used.

The amount of each of the above-mentioned components used in the preparation of the titanium catalyst component [A] cannot be indiscriminately defined, because it varies according to the process employed. For example, however, there may be used, based on 1 mole of the magnesium compound, the electron donor in an amount of about 0.01-20 moles, preferably 0.05-10 moles, and the titanium compound in an amount of about 0.01-500 moles, preferably 0.05-300 moles.

The titanium catalyst component thus obtained contains magnesium, titanium, halogen and, if necessary, an electron donor, as its essential ingredients.

In the titanium catalyst component [A], Halogen/Ti (atomic ratio) is about 4-200, preferably about 5-100, the above-mentioned electron donor/Ti (molar ratio) is about 0.1-50, preferably about 0.2-25, and Mg/Ti (atomic ratio) is about 1-100, preferably about 2-50.

In comparison with commercially available halogenated magnesium, the titanium catalyst component [A], when it is in the solid form, contains halogenated magnesium having small crystal size whose specific surface area is usually larger than about 10 $m^2/g$, preferably about 30-1000 $m^2/g$ and especially about 50-800 $m^2/g$. This solid state titanium catalyst component [A] does not substantially change in composition when it is washed with hexane, because the above-mentioned components used in said titanium catalyst component [A] are integrated into an integrated catalyst component.

The processes for the preparation of such highly active titanium catalyst components [A] as mentioned above are disclosed, for example, in Japanese Patent L-O-P Publns. Nos. 108385/1975, 126590/1975, 20297/1976, 28189/1976, 64586/1976, 2885/1976, 136625/1976, 87489/1977, 100596/1977, 147688/1977, 104593/1977, 2580/1978, 40093/1978, 40094/1978, 43094/1978, 135102/1980, 135103/1980, 152710/1980, 811/1981, 11908/1981, 18606/1981, 83006/1983, 138705/1983, 138706/1983, 138707/1983, 138708/1983, 138709/1983, 138710/1983, 138715/1983, 23404/1985, 195108/1985, 21109/1986, 37802/1986 and 37803/1986.

Usually, the titanium catalyst components [A] obtained in the manner now described are desirably those exhibiting an ethylene polymerization activity of 200 g-polymer/mmol-Ti $\times$ h $\times$ atm, preferably higher than 500 g-polymer/mmol-Ti $\times$ h $\times$ atm, when used in combination with an organoaluminum.

The transition metal compound [B-1] containing a ligand having a cycloalkadienyl skeleton used in the present invention is represented by the formula $ML_x$ wherein M is a transition metal, L is a ligand coordinating to the transition metal, at least one of L is a ligand having a cycloalkadienyl skeleton, and when at least two or more ligands having a cycloalkadienyl skeleton are contained, at least two ligands having a cycloalkadienyl skeleton may be linked together via lower alkylene, substituted alkylene, silylene or substituted silylene, L other than the ligand having a cycloalkadienyl skeleton is hydrocarbon group of 1-12 carbon atoms, alkoxy of 1-12 carbon atoms, aryloxy, halogen or hydrogen, and x is a valence of the transition metal.

In the above-mentioned formula, M which is a transition metal includes zirconium, titanium, hafnium, chromium or vanadium by preference, and particularly preferred are zirconium and hafnium.

The ligands having a cycloalkadienyl skeleton include, for example, cyclopentadienyl, alkyl-substituted cyclopentadienyl such as methylcyclopentadienyl, ethylcyclopentadienyl, n-butylcyclopentadienyl, dimethylcyclopentadienyl and pentamethylcyclopentadienyl, and indenyl and fluorenyl.

Two or more ligands having a cycloalkadienyl skeleton as mentioned above may coordinate to the transition metal and, in this case, at least two ligands having a cycloalkadienyl skeleton may be linked together via alkylene, substituted alkylene, silylene or substituted silylene. The alkylene group includes methylene, ethylene and propylene, the substituted alkylene includes isopropylidene, etc., and the substituted silylene includes dimethylsilylene and diphenylsilylene.

The ligand other than those having a cycloalkadienyl skeleton is a hydrocarbon group of 1-12 carbon atoms, an alkoxy group, an aryloxy group, halogen or hydrogen.

The hydrocarbon group having 1-12 carbon atoms mentioned above includes, for example, alkyl, cycloalkyl, aryl and aralkyl, and the alkyl group includes methyl, ethyl, propyl, isopropyl and butyl.

The cycloalkyl group mentioned above includes, for example, cyclopentyl and cyclohexyl, the aryl group includes, for example, phenyl and tolyl, and the aralkyl group includes, for example, benzyl and neophyl.

The alkoxy group mentioned above includes, for example, methoxy, ethoxy and butoxy, and the aryloxy group includes, for example, phenoxy.

The halogen mentioned above includes, for example, fluorine, chlorine, bromine and iodine.

Listed below are typical representatives of the transition metal compounds having a cycloalkadienyl skeleton, represented by the aforementioned formula $ML_x$ in which M is zirconium.

Bis(cyclopentadienyl)zirconium monochloride monohydride,
Bis(cyclopentadienyl)zirconium monobromide monohydride,
Bis(cyclopentadienyl)methyl zirconium hydride,
Bis(cyclopentadienyl)ethyl zirconium hydride,
Bis(cyclopentadienyl)phenyl zirconium hydride,
Bis(cyclopentadienyl)benzyl zirconium hydride,
Bis(cyclopentadienyl)neopentyl zirconium hydride,
Bis(methylcyclopentadienyl)zirconium monochloride hydride,
Bis(indenyl)zirconium monochloride monohydride
Bis(cyclopentadienyl)zirconium dichloride,
Bis(cyclopentadienyl)zirconium dibromide,
Bis(cyclopentadienyl)methyl zirconium monochloride,
Bis(cyclopentadienyl)ethyl zirconium monochloride,
Bis(cyclopentadienyl)cyclohexyl zirconium monochloride,
Bis(cyclopentadienyl)phenyl zirconium monochloride,
Bis(cyclopentadienyl)benzyl zirconium monochloride,
Bis(methylcyclopentadienyl)zirconium dichloride,
Bis(n-butylcyclopentadienyl)zirconium dichloride,
Bis(indenyl)zirconium dichloride,
Bis(indenyl)zirconium dibromide,
Bis(cyclopentadienyl)zirconium dimethyl,
Bis(cyclopentadienyl)zirconium diphenyl,
Bis(cyclopentadienyl)zirconium dibenzyl,
Bis(cyclopentadienyl)zirconium methoxychloride,
Bis(cyclopentadienyl)zirconium ethoxychloride,
Bis(methylcyclopentadienyl)zirconium ethoxychloride,
Bis(cyclopentadienyl)zirconium phenoxychloride,
Bis(fluorenyl)zirconium dichloride,
Ethylenebis(indenyl)dimethyl zirconium,
Ethylenebis(indenyl)diethyl zirconium,
Ethylenebis(indenyl)diphenyl zirconium,
Ethylenebis(indenyl)methyl zirconium monochloride,
Ethylenebis(indenyl)ethyl zirconium monochloride,
Ethylenebis(indenyl)methyl zirconium monobromide,
Ethylenebis(indenyl)zirconium dichloride,
Ethylenebis(indenyl)zirconium dibromide,
Ethylenebis(4,5,6,7-tetrahydro-1-indenyl)dimethyl zirconium,
Ethylenebis(4,5,6,7-tetrahydro-1-indenyl)methyl zirconium monochloride,
Ethylenebis(4,5,6,7-tetrahydro-1-indenyl)zirconium dichloride,
Ethylenebis(4,5,6,7-tetrahydro-1-indenyl)zirconium dibromide,
Ethylenebis(4-methyl-1-indenyl)zirconium dichloride,
Ethylenebis(5-methyl-1-indenyl)zirconium dichloride,
Ethylenebis(6-methyl-1-indenyl)zirconium dichloride,
Ethylenebis(7-methyl-1-indenyl)zirconium dichloride,
Ethylenebis(5-methoxy-1-indenyl)zirconium dichloride,
Ethylenebis(2,3-dimethyl-1-indenyl)zirconium dichloride,
Ethylenebis(4,7-dimethyl-1-indenyl)zirconium dichloride,
Ethylenebis(4,7-dimethoxy-1-indenyl)zirconium dichloride,
Dimethylsilylenenbis(cyclopentadienyl)zirconium dichloride,
Dimethylsilylenebis(indenyl)zirconium dichloride,
Dimethylsilylenebis(methylcyclopentadienyl)zirconium dichloride,
Isopropylidenebis(indenyl)zirconium dichloride,
Isopropylidene(cyclopentadienyl-fluorenyl)zirconium dichloride.

There may also be used transition metal compounds obtained by replacing the zirconium metal in the above-exemplified zirconium compounds with titanium metal, hafnium metal, or vanadium metal.

The transition metal compounds [B-1] as exemplified above may be supported by an inorganic carrier such as silica or alumina, a polymer such as polyethylene or polystyrene, or a solidified organoaluminum oxy-compound, and also may be pre-polymerized with olefin. When the transition metal compound is supported by the solidified organoaluminum oxy-compound, the organoaluminum oxy-compound may be used or not at the time of polymerization of olefins.

The processes for the preparation of such solid transition metal compounds are disclosed, for example, in Japanese Patent L-O-P Publns. Nos. 51405/1988, 51407/1988, 54403/1988, 61010/1988, 22804/1988, 89505/1988, 213504/1988, 260903/1988 and 280703/1988.

In particular, when olefins are polymerized by gas phase polymerization or suspension polymerization, it is desirable to use the above-mentioned solid transition metal compounds as the [B-1] component.

The organoaluminum oxy-compound [C] used in the present invention may be known aluminoxane or a benzene-insoluble organoaluminum oxy-compound first discovered by the present inventors.

The above-mentioned aluminoxane may be prepared, for example, by the following procedures.

(1) The procedure for recovering aluminoxanes as their solution in hydrocarbons which comprises reacting organoaluminum compounds such as trialkylaluminum with suspensions in hydrocarbon solvents of compounds having absorbed water or salts containing water of crystallization, for example, hydrates of magnesium chloride, copper sulfate, aluminum sulfate, nickel sulfate or cerous chloride.

(2) The procedure for recovering aluminoxanes as their solution in hydrocarbons which comprises allowing organoaluminum compounds such as trialkylaluminum to interact directly with water, ice or water vapor in solvents such as benzene, toluene, ethyl ether and tetrahydrofuran.

In this connection, the above-mentioned solution of aluminoxane may contain small amount of organometallic components. Furthermore, the solution of aluminoxane recovered by the above-mentioned procedures may be distilled to remove therefrom the solvent or unreacted organoaluminum compound, followed by dissolving again in solvents.

The organoaluminum compounds used for preparing such solutions of aluminoxane as mentioned above include, for example, trialkylaluminum such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum, tridecylaluminum, tricyclohexylaluminum, tricyclooctylaluminum; dialkylaluminum halides such as dimethylaluminum chloride, diethylaluminum chloride, diethylaluminum bromide and diisobutylaluminum chloride; dialkylaluminum hydrides such as diethylaluminum hydride and diisobutylaluminum hydride; dialkylaluminum alkoxides such as dimethylaluminum methoxide and diethylaluminum ethoxide; and dialkylaluminum aryloxides such as diethylaluminum phenoxide.

Of the organoaluminum compounds as exemplified above, particularly preferred is trialkylaluminum.

Furthermore, there may also be used as the organoaluminum compound isoprenylaluminum represented by the general formula wherein x, y and z are each a positive number, and $z \geq 2x$.

The organoaluminum compounds mentioned above may be used either singly or in combination.

Solvents used in the solutions of aluminoxane include aromatic hydrocarbons such as benzene, toluene, xylene, cumene and cymeme; aliphatic hydrocarbons such as pentane, hexane, heptane, octane, decane, dodecane, hexadecane and octadecane; alicyclic hydrocarbons such as cyclopentane, cyclohexane, cyclooctane and methylcyclopentane; petroleum fractions such as gasoline, kerosene and gas oil; or halides, particularly chloride and bromides, of the above-mentioned aromatic, aliphatic and alicyclic hydrocarbons. In addition thereto, there may also be used ethers such as ethyl ether and tetrahydrofuran. Of these solvents as exemplified above, particularly preferred are aromatic hydrocarbons.

The benzene-insoluble organoaluminum oxy-compounds of the present invention contain Al component which dissolves in benzene at 60° C. in an amount of less than 10%, preferably less than 5% and further desirably less than 2% in terms of Al atom, and they are insoluble or sparingly soluble in benzene.

Solubility in benzene of such organoaluminum oxy-compounds as mentioned above is obtained by suspending in 100 ml of benzene said organoaluminum oxy-compound in an amount corresponding to 100 mg atoms in terms of Al atom, mixing the resulting suspension at 60° C. for 6 hours, filtering the resulting mixture with G-5 glass filter equipped with a jacket kept at 60 ° C., and washing four times the solids portion separated on the filter with 50 ml of benzene at 60° C. to measure the amount (x mmol) of Al atoms present in the whole filtrate.

When the benzene-insoluble organoaluminum oxy-compounds of the present invention are analyzed by infrared spectrophotometry (IR), a ratio $(D_{1260}/D_{1220})$ of an absorbance $(D_{1260})$ at around 1260 cm$^{-1}$ to an absorbance $(D_{1220})$ at around 1220 cm$^{-1}$ is less than 0.09, preferably less than 0.08 and particularly in the range of from 0.04 to 0.07.

Infrared spectrophotometric analysis of the organoaluminum oxy-compounds as referred to in the present specification is carried out in the following manner.

First, the organoaluminum oxy-compound is ground, together with nujol, in an agate mortar in a nitrogen box to paste.

Next, the paste-like sample thus obtained is put between KBr plates, and IR spectrum is measured in a nitrogen atmosphere by means of IR-810 manufactured and sold by Nippon Bunko K. K.

Figure 1:
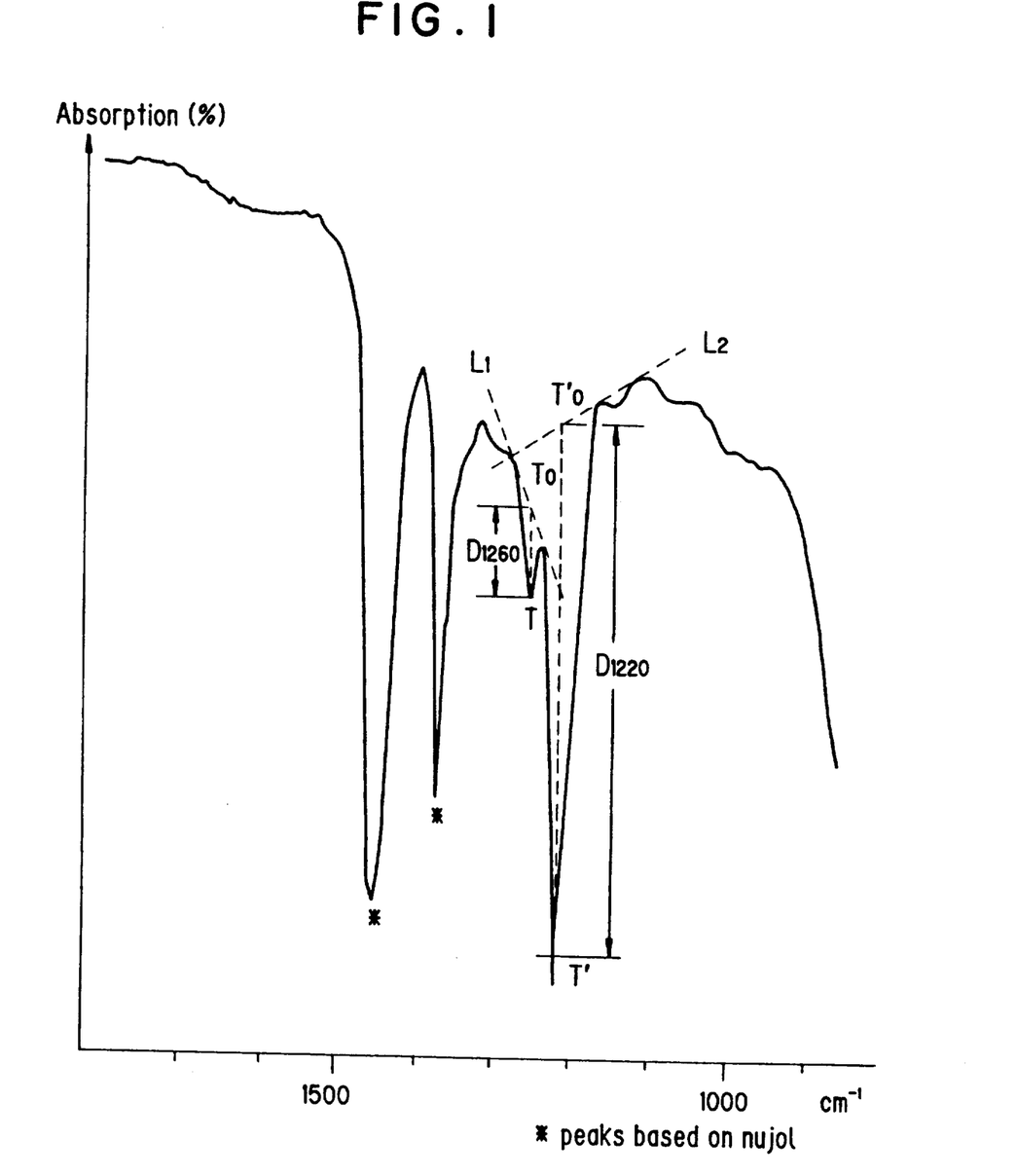
FIG. 1 is a graph showing IR spectrum of a benzene-insoluble organoaluminum oxy-compound used in the present invention.

IR spectrum of the organoaluminum oxy-compound of the present invention as obtained is shown in FIG. 1.

From the thus obtained IR spectrum, a $D_{1260}/D_{1220}$ ratio is sought, and a value of said ratio is obtained in the following manner.

(a) A line connecting a maximum point at around 1280 cm$^{-1}$ and a maximum point at around 1240 cm$^{-1}$ is taken as a base line $L_1$.

(b) A transmittance (T %) of an absorption minimum point at around 1260 cm$^{-1}$ and an transmittance (T$_0$ %) of a point of intersection are read, said point of intersection being obtained by drawing a vertical line from said absorption minimum point to a wave number abscissa axis (abscissa) and crossing said vertical line with said base line $L_1$, whereby an absorbance $D_{1260} = \log T_0/T)$ is calculated.

(c) Similarly, a line connecting maximum points at around 1280 cm$^{-1}$ and at around 1180 cm$^{-1}$ is taken as a base line $L_2$.

(d) A transmittance (T' %) of an absorption minimum point at around 1220 cm$^{-1}$ and a transmittance (T'$_0$ %) of a point of intersection are read, said point of intersection being obtained by drawing a vertical line from said absorption minimum point to a wave number abscissa axis (abscissa) and crossing said vertical line with said base line $L_2$, whereby an absorbance ($D_{1220} = \log T'_0/T'$) is calculated.

(e) From these values as obtained, $D_{1260}/D_{1220}$ is calculated.

Figure 2:
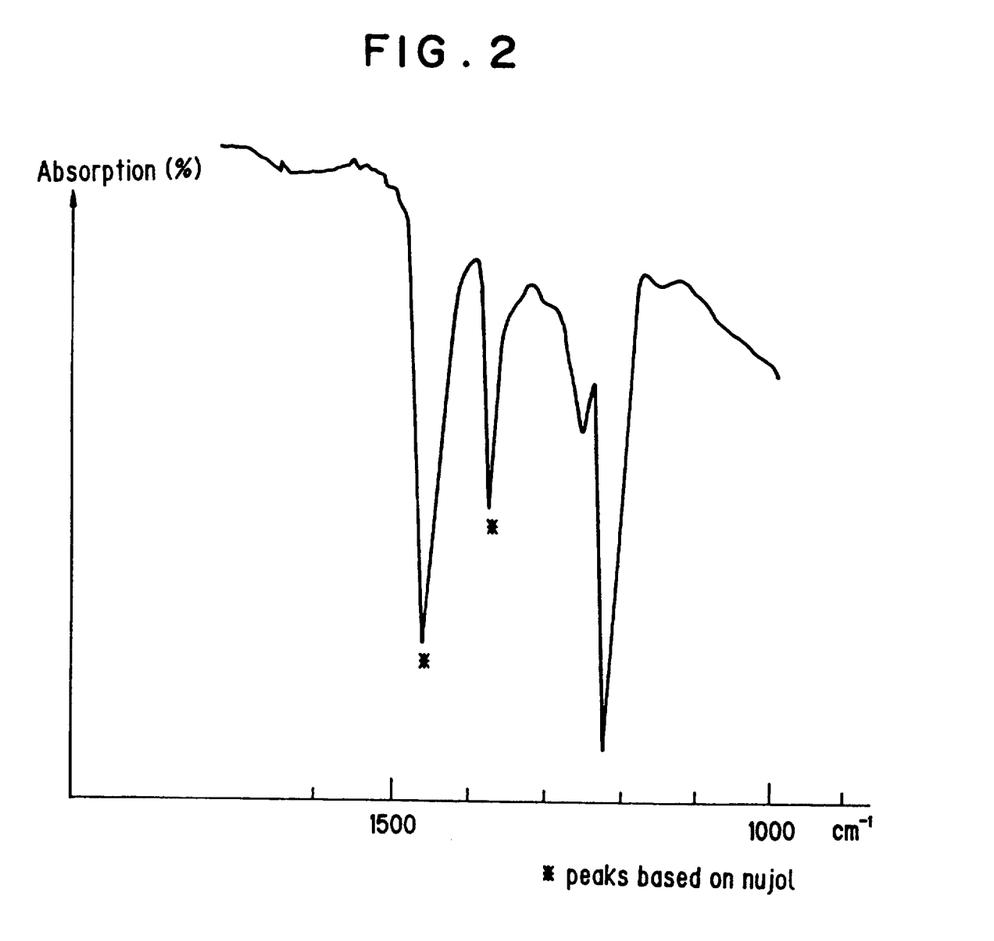
FIG. 2 is a graph showing IR spectrum of a known benzene-soluble organoaluminum oxy-compound.

IR spectrum of a known benzene-soluble organoaluminum oxy-compound is shown in FIG. 2. As can be seen from FIG. 2, the benzene-soluble aluminum oxy-compound has a value of $D_{1260}/D_{1220}$ of being virtually 0.10–0.13, and thus benzene-insoluble organoaluminum oxy-compound of the present invention is apparently different in the value of $D_{1260}/D_{1220}$ from the known benzene-soluble organoaluminum oxy-compound.

The benzene-insoluble organoaluminum oxy-compounds of the present invention are presumed to have an alkyloxyaluminum unit represented by the formula wherein $R^1$ is a hydrocarbon group of 1 to 12 carbon atoms.

In the above-mentioned alkyloxyaluminum unit, $R^1$ includes, for example, methyl, ethyl, n-propyl, isopropyl, n-butyl, isobutyl, pentyl, hexyl, octyl, decyl, cyclohexyl and cyclooctyl. Of these hydrocarbon groups exemplified above, preferred are methyl and ethyl, and particularly preferred is methyl.

In addition to the alkyloxyaluminum unit of the formula the benzene-insoluble organoaluminum oxy-compounds of the present invention may contain an oxyaluminum unit represented by the formula wherein $R^1$ is as defined above, and $R^2$ is a hydrocarbon group of 1 to 12 carbon atoms, an alkoxyl group of 1 to 12 carbon atoms, an aryloxy group of 6 to 20 carbon atoms, a hydroxyl group, halogen or hydrogen, provided that $R^1$ and $R^2$ are different from each other. In that case, the organoaluminum oxy-compounds desirably contain the alkyloxyaluminum unit in a proportion of at least 30 mol %, preferably at least 50 mol % and particularly at least 70 mol %.

The processes for preparing the benzene-insoluble organoaluminum oxy-compounds of the present invention are illustrated below in detail.

The first process for preparing the benzene-insoluble organoaluminum oxy-compounds of the present invention is characterized by bringing a solution of aluminoxane into contact with water or active hydrogen containing compounds.

The active hydrogen containing compounds used in the present invention include alcohols such as methanol, ethanol, n-propanol and isopropanol; diols such as ethylene glycol and hydroquinone; and organic acids such as acetic acid and propionic acid. Of these compounds, preferred are alcohols and diols, and especially preferred are alcohols.

Water or the active hydrogen containing compounds with which the solution of aluminoxane is brought into contact may be used as solutions or dispersions in hydrocarbon solvents such as benzene, toluene and hexane, ether solvents such as tetrahydrofuran or amine solvents such as triethylamine, or may be used in the form of vapor or solid. The water with which the solution of aluminoxane is brought into contact may be water of crystallization of salts such as magnesium chloride, magnesium chloride, magnesium sulfate, copper sulfate, nickel sulfate, iron sulfate and cerous chloride, or absorbed water absorbed to inorganic compounds such as silica, alumina and aluminum hydroxide or polymers.

Reaction of the solution of aluminoxane with water or the active hydrogen containing compounds is carried out usually in solvents, for example, hydrocarbon solvents. The solvents used in this case are aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclohexane; petroleum fractions such as gasoline, kerosene and gas oil; halogenated hydrocarbons such as halides of the above-mentioned aromatic hydrocarbons, aliphatic hydrocarbons and alicyclic hydrocarbons, particularly, chlorides and bromides; and ethers such as ethyl ether and tetrahydrofuran. Of these solvents as exemplified above, particularly preferred are aromatic hydrocarbons.

In the reaction as mentioned above, water or the active hydrogen containing compound is used in an amount of 0.1–5 moles, preferably 0.2–3 moles to 1 mole of Al atoms present in the solution of aluminoxane. A concentration in terms of aluminum atom in the reaction system is desirably $1 \times 10^{-3}$–5 gram atom/l, preferably $1 \times 10^{-2}$–3 gram atom/l, and a concentration of water in the reaction system is desirably $2 \times 10^{-4}$–5 mol/l, preferably $2 \times 10^{-3}$–3 mol/l.

The solution of aluminoxane may be brought into contact with water or the active hydrogen containing compound, for example, by the following procedures.

(1) The procedure which comprises bringing the solution of aluminoxane into contact with a hydrocarbon solvent containing water or the active hydrogen containing compound.

(2) The procedure which comprises blowing vapor of water or the active hydrogen containing compound into the solution of aluminoxane, thereby bringing the aluminoxane into contact with the vapor.

(3) The procedure which comprises bringing the solution of aluminoxane into contact directly with water, ice or the active hydrogen containing compound.

(4) The procedure which comprises mixing the solution of aluminoxane with a suspension of an absorbed water containing compound or a water of crystallization containing compound in hydrocarbon, or with a suspension of a compound, to which the active hydrogen containing compound has been absorbed, in hydrocarbon, thereby bringing the aluminoxane into contact with the absorbed water or water of crystallization.

The solution of aluminoxane may contain other components so long as they do not exert adverse effects on the reaction of aluminoxane with water or the active hydrogen containing compound.

The above-mentioned reaction of the solution of aluminoxane with water or the active hydrogen containing compound is carried out usually at −50° to 150° C., preferably 0°-120° C. and more desirably at 20°-100° C. The reaction time employed is usually 0.5-300 hours, preferably 1-150 hours, though said reaction time varies largely depending upon the reaction temperature used.

The benzene insoluble organoaluminum oxy-compound may also be prepared by direct contact of orranoaluminum with water. In the reaction mentioned above, water is used in such amount that the organoaluminum atom dissolved in the reaction system is less than 20%, based on total organoaluminum atom.

Water with which the organoaluminum compound is brought into contact may be used as solutions or dispersions in hydrocarbon solvents such as benzene, toluene and hexane, ether solvents such as tetrahydrofuran or amine solvents such as triethylamine, or may be used in the form of vapor or solid. The water with which the organoaluminum compound is brought into contact may be water of crystallization of salts such as magnesium chloride, magnesium chloride, magnesium sulfate, copper sulfate, nickel sulfate, iron sulfate and cerous chloride, or absorbed water absorbed to inorganic compounds such as silica, alumina and aluminum hydroxide or polymers.

Reaction of the organoaluminum compound with water is carried out usually in solvents, for example, hydrocarbon solvents. The solvents used in this case are aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclohexane; petroleum fractions such as gasoline, kerosene and gas oil; halogenated hydrocarbons such as halides of the above-mentioned aromatic hydrocarbons, aliphatic hydrocarbons and alicyclic hysrocarbons, particularly, chlorides and bromides; and ethers such as ethyl ether and tetrahydrofuran. Of these solvents as exemplified above, particularly preferred are aromatic hydrocarbons.

A concentration of organoaluminum compound in the reaction system in terms of aluminum atom is desirably $1 \times 10^{-3}$–5 gram atom/l, preferably $1 \times 10^{-2}$–3 gram atom/l, and a concentration of water in the reaction system is desirably $1 \times 10^{-3}$–5 mol/l, preferably $1 \times 10^{-2}$–3 mol/l.

In the reaction mentioned above, the organoaluminum atom dissloved in the reaction system is less than 20%, preferably less than 10 %, more preferably 0 to 5% based on total organoaluminum atom.

The organoaluminum compound may be brought into contact with water, for example, by the following procedures.

(1) The procedure which comprises bringing the hydrocarbon solution of organoaluminum into contact with a hydrocarbon solvent containing water.

(2) The procedure which comprises blowing vapor of water into the hydrocarbon solution of organoaluminum, thereby bringing the organoaluminum into contact with the vapor.

(3) The procedure which comprises mixing the hydrocarbon solution of organoaluminum with a suspension of an absorbed water containing compound or a water of crystallization containing compound in hydrocarbon, thereby bringing the organoaluminum into contact with the absorbed water or water of crystallization.

(4) The procedure which comprises bringing the hydrocarbon solution of organoaluminum into contact directly with ice.

The hydrocarbon solution of organoaluminum may contain other components so long as they do not exert adverse effects on the reaction of organoaluminum with water.

The above-mentioned reaction of the organoaluminum with water is carried out usually at −100° to 150 ° C., preferably −70° to 100 ° C. and more desirably at −50° to 80° C. The reaction time empolyed is usually 1 to 200 hours, preferably 2 to 100 hours, though said reaction time varies largely depending upon the reaction temperature used.

The organoaluminum compounds [D] used in the present invention may be represented, for example, by the formula $R^6{}_n AlX_{3-n}$ wherein $R^6$ is hydrocarbon of 1-12 carbon atoms, X is halogen and n is 1-3.

In the above-mentioned formula, $R^6$ is hydrocarbon of 1-12 carbon atoms, for example, alkyl, cycloalkyl or aryl, including concretely methyl, ethyl, n-propyl, isopropyl, isobutyl, pentyl, hexyl, octyl, decyl, cyclopentyl, cyclohexyl, phenyl, tolyl, etc.

The above-mentioned organoaluminum compounds will be exemplified below.

Trialkylaluminum such as trimethylaluminum, triethylaluminum, triisopropylaluminum, triisobutylaluminum, trihexylaluminum, trioctylaluminum, tri-2-ethylhexylaluminum, etc.

Alkenylaluminum such as isoprenylaluminum, etc.

Dialkylaluminum halides such as dimethylaluminum chloride, diethylaluminum chloride, diisopropylaluminum chloride, diisobutylaluminum chloride, dimethylaluminum bromide, etc.

Alkylaluminum sesquihalides such as methylaluminum sesquichloride, ethylaluminum sesquichloride, butylaluminum sesquichloride, ethylaluminum sesquibromide, etc.

Alkylaluminum dihalides such as methylaluminum dichloride, ethylaluminum dichloride, isopropylaluminum dichloride, ethylaluminum dibromide, etc.

Alkylaluminum hydrides such as diethylaluminum hydride, isobutylaluminum hydride, etc.

Furthermore, there may also be used other organoaluminum compounds represented by the formula $R^6{}_n AlY_{3-n}$ wherein $R^6$ is as defined previously, Y is $-OR^7$, $-OSiR^8{}_3$, $-OAlR^9{}_2$, $-NR^{10}{}_2$, $-SiR^{11}{}_3$ or n is 1-2, $R^7$, $R^8$, $R^9$ and $R^{13}$ are each methyl, ethyl, isopropyl, isobutyl, cyclohexyl or phenyl, $R^{10}$ is hydrogen, methyl, ethyl, isopropyl, phenyl or trimethylsilyl, $R^{11}$ and $R^{12}$ are each methyl or ethyl.

The organoaluminum compounds as mentioned above include, in concrete, such compounds as enumerated below.

(i) Compounds of the formula $R^6{}_nAl(OR^7)_{3-n}$ such as dimethylaluminum methoxide, diethylaluminum ethoxide, diisobutylaluminum methoxide, etc.

(ii) Compounds of the formula $R^6{}_nAl(OSiR^8{}_3)_{3-n}$ such as $Et_2Al(OSiMe_3)$, $(iso\text{-}Bu)_2Al(OSiMe_3)$, $(iso\text{-}Bu)_2Al(OSiEt_3)$, etc.

(iii) Compounds of the formula $R^6{}_nAl(OAlR^9{}_2)_{3-n}$ such as $Et_2AlOAlEt_2$, $(iso\text{-}Bu)_2AlOAl(iso\text{-}Bu)_2$, etc.

(iv) Compounds of the formula $R^6{}_nAl(NR^{10}{}_2)_{3-n}$ such as $Me_2AlNEt_2$, $Et_2AlNHMe$, $Me_2AlNHEt$, $Et_2AlN(Me_3Si)_2$, $(iso\text{-}Bu)_2AlN(Me_3Si)_2$, etc.

(v) Compounds of the formula $R^6{}_nAl(SiR^{11}{}_3)_{3-n}$ such as $(iso\text{-}Bu)_2AlSiMe_3$, etc.

(vi) Compounds of the formula such as etc.

Of the organoaluminum compounds as exemplified above, preferred are those of the formula $R^6{}_3Al$, $R^6{}_nAl(OR^7)_{3-n}$ and $R^6Al(OAlR^9{}_2)_{3-n}$, particularly those in which $R^6$ is isoalkyl and $n=2$ are desirable. These organoaluminum compounds may be used in combination of two or more.

In the practice of polymerization of olefins with the above-mentioned olefin polymerization catalyst as mentioned above, it is desirable to use the titanium catalyst component [A] in an amount of usually $10^{-8}$–$10^{-3}$ gram atom-Ti/l, preferably $10^{-7}$–$10^{-4}$ gram atom-Ti/l, the transition metal compound [B-1] containing a ligand having a cycloalkadienyl skeleton in an amount of usually $10^{-8}$–$10^{-3}$ mol/l, preferably $10^{-7}$–$10^{-4}$ mol/l, and the transition metal compound [B-1] containing a ligand having a cycloalkadienyl skeleton in an amount, based on 1 gram Ti atom of titanium catalyst component [A] of usually 0.02–10 moles, preferably 0.05–5 moles.

The organoaluminum oxy-compound [C] is desirably used in an amount of usually $10^{-6}$–$10^{-2}$ gram atom-Al/l, preferably $10^{-5}$–$3\times10^{-3}$ gram atom-Al/l.

The organoaluminum compound [D] is desirably used in an amount of usually $5\times10^{-5}$–$5\times10^{-2}$ mol/l, preferably $10^{-4}$–$10^{-2}$ mol/l.

Further, a ratio (atomic ratio) of aluminum/total transition metal is desirably 10–5000, preferably 20–2000, and a ratio (in terms of Al) of the organoaluminum oxy-compound [C] to the organoaluminum compound [D] is desirably in the range of from 0.1 to 20, preferably from 0.2 to 10.

The second olefin polymerization solid catalyst of the present invention is formed by pre-polymerizing olefin in a suspension containing the above-mentioned solid titanium catalyst component [A], the transition metal compound [B-1] containing a ligand having a cycloalkadienyl skeleton, the organoaluminum oxy-compound [C] and, if necessary, organoaluminum compound [D]. This pre-polymerization may be carried out by polymerizing α-olefin in a polymerization amount, based on 1 g of the olefin polymerization catalyst, of 0.1–500 g, preferably 0.3–300 g and especially 1–100 g.

Usually, the pre-polymerization is carried out in the manner as will be mentioned below.

In carrying out the pre-polymerization, the solid titanium catalyst component [A], the transition metal compound [B-1] containing a ligand having a cycloalkadienyl skeleton, the organoaluminum oxy-compound [C] and, if necessary, the organoaluminum compound [D] are mixed together so as to bring them into contact with one another, followed by introducing the olefin thereinto.

In this case, the components [A], [B], [C] and [D] may be mixed together at once or may be mixed one after another.

The temperature at which the above-mentioned components are mixed and brought into contact with one another is in the range of usually from $-50°$ to $100°$ C., preferably from $-20°$ to $50°$ C., and the mixing-contacting time is in the range of usually from 0.2 to 50 hours, preferably from 0.5 to 20 hours, though it varies according to the reaction temperature or the order of mixing.

The pre-polymerization temperature employed is in the range of usually from $-20°$ to $60°$ C., preferably from $0°$ to $50°$ C., and the pre-polymerization time is in the range of usually from 0.5 to 100 hours, preferably from 1 to 50 hours, though it varied according to the pre-polymerization amount or temperature.

In carrying out the pre-polymerization, it is possible to use the catalyst in a concentration considerably higher than that used in the system of the main polymerization.

In the pre-polymerization, it is desirable to use the solid titanium catalyst component [A] in a concentration, based on 1 L of an inert hydrocarbon medium as will be mentioned later, of usually about 0.01–200 mg atom-Ti, preferably about 0.1–100 mg atom-Ti and especially 1–50 mg atom-Ti.

Further, in carrying out the pre-polymerization, the transition metal compound [B-1] containing a ligand having a cycloalkadienyl skeleton is desirably used in an amount, based on 1 gram atom of titanium in the titanium catalyst component, of 0.02–10 moles, preferably 0.05–5 moles.

Similarly, the organoaluminum oxy-compound [C] is desirably used in an amount, based on 1 mole of the transition metal atom in the transition metal compound [B-1], of 10–500 gram atom-Al, preferably 20–200 gram atom-Al.

Furthermore, the organoaluminum compound [D], when used if any, is desirably in an amount, based on 1 mole of the transition metal atom in the component [B-1], of 1–200 moles, preferably 2–100 moles.

The pre-polymerization is desirably carried out by using a mixture of olefin, the above-mentioned catalyst components and an inert hydrocarbon medium in a suspension state under mild conditions.

The inert hydrocarbon medium used herein includes aliphatic hydrocarbons such as propane, butane, pentane, hexane, heptane, octane, decane dodecane and kerosine; alyciclic hydrocarbons such as cyclopentane, cyclohexane and methylcyclopentane; aromatic hydrocarbons such as benzene, toluene and xylene; halogenated hydrocarbons such as ethylene chloride and chlorobenzene; or mixtures thereof. Further, the pre-polymerization may be carried out by using the olefin itself as a solvent, or may be carried out in a state substantially free from the solvent.

The olefin used in the pre-polymerization may be the same as used in the main polymerization as will be mentioned later or different therefrom. Of the olefins mentioned above, preferred is ethylene, in particular.

In the pre-polymerization, a molecular weight modifier such as hydrogen may also be used. The molecular weight modifier mentioned above is desirably used in such an amount that an intrinsic viscosity [n], as measured in decalin at 135° C., of the resulting polymer from the pre-polymerization becomes higher than about 0.2 dl/g, preferably about 0.5–10 dl/g.

The pre-polymerization is desirably carried out so that the amount, based on 1 g of the above-mentioned solid catalyst, of the polymer formed is about 0.1–500 g, preferably about 0.3–300 g and especially 1–100 g. If the pre-polymerization amount of the olefin is preset to become excessively large, the production efficiency of the desired olefin polymers sometimes decreases.

In the pre-polymerized solid catalyst thus obtained, the amount of titanium atom derived from the component [A], based on 1 gram atom of the transition metal atom derived from the component [B-1], is desirably in the range of 0.05–20 gram atom, preferably 0.1–10 gram atom and especially 0.2–5 gram atom, and similarly the total sum of aluminum atoms derived from the components [C] and [D] is 15–500 gram atom, preferably 20–200 gram atom.

The olefin polymerization solid catalysts as prepared in the manner mentioned above exhibit by themselves excellent polymerization activities in the polymerization of olefins.

The third olefin polymerization catalyst of the present invention comprises (I) the solid catalyst as formed in the above-mentioned manner by pre-polymerizing olefin in a suspension containing
   [A] a solid titanium catalyst component containing titanium, magnesium and halogen as its essential ingredients,
   [B-1] a transition metal compound containing a ligand having a cycloalkadienyl skeleton, and
   [C] an organoaluminum oxy-compound and
(II) the organoaluminum oxy-compound [C] and/or the organoaluminum compound [D].

In the practice of polymerization of olefins with the above-mentioned olefin polymerization catalyst, it is desirable to use the solid titanium catalyst component [A] in an amount of $10^{-8}$–$10^{-3}$ gram atom-Ti/l, preferably $10^{-7}$–$10^{-4}$ gram atom-Ti/l, the transition metal atom of the transition metal compound [B-1] containing a ligand having a cycloalkadienyl skeleton in an amount of usually $10^{-8}$–$10^{-3}$ gram atom, preferably $10^{-7}$–$10^{-4}$ gram atom, and the aluminum atoms derived from the organoaluminum oxy-compound [C] and the organoaluminum compound [D] in an amount of usually $10^{-6}$–$10^{-2}$ gram atom, preferably $10^{-5}$–$3 \times 10^{-3}$ gram atom.

Similarly, it is desirable to use the organoaluminum oxy-compound [C] and/or the organoaluminum compound [D] in an amount of usually $10^{-7}$–$5 \times 10^{-3}$ gram atom-Al/l, preferably $10^{-6}$–$2 \times 10^{-3}$ gram atom-Al/l.

The fourth olefin polymerization catalyst of the present invention is then illustrated below.

The fourth olefin polymerization catalyst of the invention comprises

[A] a titanium catalyst component containing titanium, magnesium and halogen as its essential ingredients,

[B-2] a transition metal compound containing a ligand having cycloalkadienyl skeleton and an anion compound containing boron, and

[C] an organoaluminum oxy-compound and/or [D] an organoaluminum compound.

The titanium catalyst component [A], the organoaluminum oxy-compound [C] and the organoaluminum compound [D] used in the fourth olefin polymerization catalyst as mentioned above are the same as those mentioned hereinbefore.

Accordingly, illustrated hereinbelow is [B-2] the transition metal compound containing a ligand having a cycloalkadienyl skeleton and an anion compound containing boron.

The transition metal compound [B-2] containing a ligand having a cycloalkadienyl skeleton and an anion compound containing boron used in the present invention is a contact reaction product of a transition metal compound [B-1] containing a cycloalkadienyl skeleton, a Brønsted acid [B-b] or proton and an anion compound containing boron [B-c].

The transition metal compound [B-1] containing a ligand having a cycloalkadienyl skeleton used herein includes the same compounds as mentioned hereinbefore.

The Brønsted acid [B-b] mentioned above is represented by the formula $[M^2R_4]^+$ wherein $M^2$ is nitrogen or phosphorus, R is hydrogen or a hydrocarbon group, provided that at least one of R is hydrogen.

In the above formula, the hydrocarbon group may include alkyl, cycloalkyl, aryl, aralkyl, etc. concretely, the alkyl group includes methyl, ethyl, propyl, isopropyl, butyl, etc., the cycloalkyl group includes cyclopentyl, cyclohexyl, etc., the aryl group includes phenyl, tolyl, etc., and the aralkyl group includes benzyl, neophyl, etc.

Listed below are typical representatives of the above-mentioned Brønsted acid [B-b].

Trimethylammonium,
Triethylammonium,
Tripropylammonium,
Tri(n-butyl)ammonium,
N,N-dimethylanilinum,
N,N-diethylanilinum,
N,N-2,4,5-pentamethylanilinum,
Di(i-propyl)ammonium,
Dicyclohexylammonium,
Triphenylphosphonium,
Tri(methylphenyl)phosphonium,
Tri(dimethylphenyl)phosphonium.

The anion compound containing boron [B-c] used in the invention is represented by the formula wherein B is boron, $R^1$ and $R^2$ are each aromatic hydrocarbon, and $R^3$ and $R^4$ are each hydrogen, halogen, hydrocarbon, substituted hydrocarbon or organometalloid; the formula wherein C and B are carbon and boron, respectively, $R^5$, $R^6$ and $R^7$ are each hydrogen, hydrocarbon or organometalloid, $x_1$ and $x_3$ are each an integer of $\geq 0$, a is an integer of $\geq 1$, $x_1 + x_3 + a$ is an even number of from 2 to about 8, and $x_2$ is an integer of from 5 to about 22; the formula $$[[[(CR^8)_{x_1}(BR^9)_{x_2}(R^{10})_{x_3}]^{a-}]_2 M^{\eta}]^{b-}$$

wherein C, B and M are carbon, boron and a transition metal, respectively, $R^8$, $R^9$ and $R^{10}$ are each hydrogen, halogen, hydrocarbon or organometalloid, $x_1$ and $x_3$ are each an integer $\geq 0$, a is an integer of $\geq 2$, $x_1 + x_3 + a$ is an even number of from 4 to about 8, $x_2$ is an integer number of from 6 to about 12, n is such an integer as to make $2a - n = b$, and b is an integer of $\leq 1$; or the formula $$[(CH)_{x_1}(BH)_{x_2}]^{a-}$$

wherein C, B and H are carbon, boron and hydrogen, respectively, $x_1$ is 0 or 1, a is 2 or 1, $x_1 + a$ is 2, and $x_2$ is an integer of from 10 to 12.

Listed below are typical representatives of the above-mentioned [B-c] anion compound containing boron.
Tetraphenyl borate,
Tetra(p-tolyl) borate,
Tetra(o-tolyl) borate
Tetra(m,m-dimethylphenyl) borate,
Tetra(o,m-dimethylphenyl) borate,
Tetra(pentafluorphenyl) borate
7,8-Dicarbaundecaborate,
Tridecahydride-7-carbaundecaborate,
Octadecaborate,
Bis(undecahydride-7,8-dicarbaundecaborate) cobaltate (III)
Bis(7,8-dicarbaundecaborate) nickelate (III),
Bis(7,8-dicarbaundecaborate) ferrate (III),
Dodecaborate,
1-carbaundecaborate,
1-carbadodecaborate.

The contact reaction of the transition metal compound [B-1] containing a ligand having a cycloalkadienyl skeleton, the Bronsted acid [B-b] or proton and the [B-c] anion compound containing boron [B-c] is desirably carried out at a temperature of from $-50°$ to $150°$ C., preferably in an organic solvent such as toluene.

The fourth olefin polymerization catalyst of the invention may be formed by pre-polymerizing olefin in a suspension containing the above-mentioned titanium catalyst component [A], transition metal compound [B-2] containing a ligand having a cycloalkadienyl skeleton and anion compound containing boron and, if necessary, organoaluminum oxy-compound [C] and/or organoaluminum compound [D]. In this case, the pre-polymerization is carried out by pre-polymerizing α-olefin in an amount, based on 1 g of the olefin polymerization catalyst, of 0.1-500 g, preferably 0.3-300 g and especially 1-100 g.

Usually, the pre-polymerization is carried out in the manner as will be mentioned hereinafter.

In a hydrocarbon solvent, the titanium catalyst component [A], the transition metal compound [B-2] containing a ligand having a cycloalkadienyl skeleton and an anion compound containing boron and, if necessary, the organoaluminum oxy-compound [C] and/or the organoaluminum compound [D] are mixed so as to bringing them into contact with one another, followed by introducing the olefin thereinto to carry out pre-polymerization. In this case, the components [A], [B], [C] and [D] may be mixed together or one after another.

The temperature at which the above-mentioned components are brought into contact with one another is usually from $-50°$ to $100°$ C., preferably from $-20°$ to $50°$ C., and the mixing and contacting time is usually 0.2-50 hours, preferably 0.5-20 hours or thereabouts, though it varies according to the reaction temperature or the order of mixing.

The pre-polymerization temperature is usually from $-20°$ to $60°$ C., preferably from $0°$ to $50°$ C., and the pre-polymerization time is usually 0.5-100 hours, preferably 1-50 hours or thereabouts, though it varies according to the pre-polymerization amount or temperature.

In the pre-polymerization, the catalyst can be used in a concentration considerably higher than that of the catalyst used in the system of the main polymerization.

In carrying out the pre-polymerization, it is desirable to use the titanium catalyst component [A] in a concentration, based on 1 L of an inert hydrocarbon medium as will be mentioned later, of usually about 0.01-200 mg atom, preferably about 0.1-100 mg atom and especially 1-50 mg atom in terms of Ti atom.

Similarly, it is desirable to use the transition metal compound [B-2] containing a ligand having a cycloalkadienyl skeleton and an anion compound containing boron in an amount, based on 1 gram atom of Ti atom in the component [A], 0.02-10 moles, preferably 0.05-5 moles.

Further, if necessary, it is desirable to use the organoaluminum oxy-compound [C] in an amount, based on 1 mole of the transition metal atom in the compound [B-2], of 10-500 gram atom, preferably 20-200 gram atom in terms of Al atom.

Furthermore, it is desirable to use, if necessary, the organoaluminum compound [D] in an amount, based on 1 mole of the transition metal atom in the component [B-2], of 1-200 moles, preferably 2-100 moles.

The pre-polymerization is preferably carried out by using a suspension of the olefin and the above-mentioned components in the inert hydrocarbon medium under mild conditions.

The inert hydrocarbon medium used herein include concretely aliphatic hydrocarbons such as propane, butane, pentane, hexane, heptane, octane, decane, dodecane and kerosine; alicyclic hydrocarbons such as cyclopentane, cyclohexane and methylcyclopentane; aromatic hydrocarbons such as benzene, toluene and xylene; halogenated hydrocarbons such as ethylene chloride and chlorobenzene; or mixtures thereof. Further, the pre-polymerization may be carried out by using the olefin itself as a solvent, or may be carried out in a state substantially free from solvent.

The olefins used in the pre-polymerization may be the same or different from those used in the main polymerization as will be mentioned later. Of the olefins mentioned above, preferred is ethylene, in the concrete.

In carrying out the pre-polymerization it is also possible to use such a molecular weight modifier as hydrogen. The molecular weight modifier as mentioned above is desirably used in such an amount that an intrinsic viscosity [η], as measured in decalin at 135° C., of the polymer obtained by the pre-polymerization becomes more than about 0.2 dl/g, preferably about 0.5-10 dl/g.

The pre-polymerization is desirably carried out so that the polymer is formed in an amount, per 1 g of the above-mentioned solid catalyst, of about 0.1-500 g, preferably about 0.3-300 g and especially 1-100 g. If the pre-polymerization amount is preset to be excessively large, the production efficiency of the desired olefin polymer sometimes decreases.

In the pre-polymerization solid catalyst thus obtained, it is desirable that the titanium atoms derived from the component [A], based on 1 gram atom of the transition metal atoms derived from the component [B-2], is in the range of 0.05-20 gram atom, preferably 0.1-10 gram atom, more preferably 0.2-5 gram atom, and the total sum of aluminum atoms derived from the components [C] and [D] is 15-500 gram atom, preferably 20-200 gram atom.

The olefin polymerization solid catalyst as prepared in the manner mentioned above exhibit for themselves excellent polymerization activities in polymerization of olefins.

In carrying out polymerization of olefins with the olefin polymerization catalyst comprising the above-mentioned component [A], component [B-2], component [C] and/or component [D], it is desirable to use the titanium catalyst component [A] in an amount of usually about $10^{-8}$-$10^{-3}$ gram atom-Ti/l, preferably about $10^{-7}$-$10^{-4}$ gram atom-Ti/l.

Similarly, it is desirable to use the transition metal compound [B-2] containing a ligand having a cycloalkadienyl skeleton and an anion compound containing boron in an amount of usually $10^{-8}$-$10^{-3}$ mol/l, preferably $10^{-7}$-$10^{-4}$ mol/l.

It is also desirable to use this transition metal compound [B-2] in an amount, based on 1 mole of the titanium atom in the component [A], of 0.02-10 moles, preferably 0.05-5 moles.

Further, it is desirable to use the organoaluminum oxy-compound [C] and/or the organoaluminum compound [D], if necessary, in an amount of usually $10^{-5}$-$10^{-2}$ gram atom-Al/l, preferably $10^{-4}$-$5 \times 10^{-3}$ gram atom-Al/l in terms of Al atom.

The fifth olefin polymerization catalyst of the present invention comprises (I) a solid catalyst component formed by pre-polymerizing olefin in a suspension containing
  [A] a titanium catalyst component containing titanium, magnesium and halogen as its essential ingredients,
  [B-2] a transition metal compound containing a ligand having a cyclopentadienyl skeleton and an anion compound containing boron and, if necessary,
  [C] an organoaluminum oxy-compound and/or [D] an organoaluminum compound, and
(II) [C] an organoaluminum oxy-compound and/or [D] an organoaluminum compound.

In carrying out polymerization or copolymerization of olefins with the above-mentioned olefin polymerization catalyst, the above-mentioned components [A], [B-2] and [C] and/or [D] are used in the amounts as defined above.

Olefins which can be polymerized with the above-mentioned olefin polymerization catalysts include ethylene and α-olefins having 3 to 20 carbon atoms, for example, propylene, 1-butene, 1-hexene, 4-methyl-1-pentene, 1-octene, 1-decene, 1-dodecene, 1-tetradecene, 1-hexadecene, 1-octadecene, 1-eicosene, cyclopentene, cycloheptene, norbornene, 5-methyl-2-norbornene, tetracyclododecene and 2-methyl-1,4,5,8-dimethano-1,2,3,4,4a,5,8,8a-octahydronaphthalene.

In addition to those exemplified above, there may also be used styrene, vinyl cyclohexane and diene, etc.

In the present invention, such olefins as exemplified above may be polymerized or copolymerized either by liquid phase polymerization such as solution or suspension polymerization or vapor phase polymerization.

The polymerization temperature employed in polymerizing the olefins with the above-mentioned olefin polymerization catalysts is in the range of usually from $-50°$ to $200°$ C., preferably from $0°$ to $150°$ C. The polymerization pressure employed is usually from atmospheric pressure to 100 kg/cm², preferably from atmospheric pressure to 50 kg/cm², and the polymerization reaction may be carried out by any of the batchwise, semi-continuous and continuous methods. Further, the polymerization may be carried out at two or more stages under different reaction conditions. The molecular weight of the olefin polymer resulting the polymerization may be modified by allowing hydrogen to exist in the polymerization system or by changing the polymerization temperature employed.

The olefin polymerization catalysts of the present invention formed from the components as mentioned hereinbefore have excellent polymerization activities and are capable of giving olefin polymers having a broad molecular weight distribution and excellent moldablility.

In the present invention, the olefin polymerization catalysts may also certain other components useful for olefin polymerization in addition to such components as mentioned hereinbefore.

EFFECT OF THE INVENTION

The olefin polymerization catalysts of the present invention exhibit excellent polymerization activities when used in the polymerization of olefins and also are capable of giving olefin (co)polymers having a broad molecular weight distribution and excellent moldability.

The present invention is illustrated below with reference to examples, but it should be construed that the invention is in no way limited to those examples.

The molecular weight distribution ($\overline{Mw}/\overline{Mn}$) and composition distribution (amount of n-decane soluble portion) referred to in the examples of the invention were obtained by the following manner.

The value of $\overline{Mw}/\overline{Mn}$ is determined by the following procedure in accordance with Takeuchi, "Gel Permeation Chromatography", Maruzen, Tokyo.

(1) Using a standard polystyrene having a known molecular weight (mono-dispersed polystyrene produced by Toyo Soda Mfg. Co., Ltd.), a molecular weight M and its GPC (Gel Permeation Chromatograph) count are determined to prepare a correlation diagram calibration curve of the molecular weight and EV (evolution volume). At this time, the concentration is preset to 0.02% by weight.

(2) GPC chromatograph of a sample is prepared by GPC measurement, and a number average molecular weight $\overline{Mn}$ and a weight average molecular weight $\overline{Mw}$ in terms of polystyrene are calculated on the basis of the above-mentioned (1) to obtain a value of $\overline{Mw}/\overline{Mn}$. In that case, the conditions under which the sample is prepared and the GPC measurement is conducted are as in the following.

Preparation of sample (a) The sample together with o-dichlorobenzene solvent are dispensed by Erlenmeyer flask so that the sample content becomes 0.1% by weight.

(b) The flask is heated to 140° C. and stirred for about 30 minutes to dissolve the sample in the solvent.

(c) The solution is filtered, and the filtrate is subjected to GPC.

GPC measurement conditions

The measurement was carried out under the following conditions.
(a) Equipment: 150C-ALC/GPC mfd. by Waters Co.
(b) Column: GMH Type mfd. by Toyo Soda Mfg. Co., Ltd.
(c) Amount of sample: 400 μ liters
(d) Temperature: 140° C.
(e) Flow rate: 1 ml/min.

The measurement of the amount of n-decane-soluble portion (the smaller amount of soluble portion means the narrower composition distribution) was conducted by adding about 3 g of a copolymer of 450 ml of n-decane, dissolving the copolymer in n-decane at 145° C., followed by cooling to 23° C. Thereafter, the n-decane-insoluble portion was removed by filtration, and the n-decane-soluble portion was recovered from the filtrate, thereby measuring the amount of the n-decane-soluble portion.

Further, MFR of the copolymer was measured at 190° C. under a load of 2.16 kg.

EXAMPLE 1

Preparation of titanium catalyst component [A]

A 400 ml glass flask charged with 5.1 g of commercially available anhydrous magnesium chloride and 194 ml of decane with stirring was added dropwise 18.8 ml of ethanol over a period of 10 minutes, followed by stirring at room temperature for 1 hour. Thereafter, 17.5 ml of diethylaluminum diluted with 20 ml of decane was added dropwise to the flask over a period of 1 hour, while maintaining the temperature within the system at 35°–40° C. After completion of the addition, the flask was further stirred at room temperature for 1 hour. Successively, 70.6 ml of titanium tetrachloride was added dropwise to the flask over a period of 30 minutes, and the flask was then heated to 80° C., followed by stirring at that temperature for 2 hours.

The reaction product obtained was filtered with a glass filter equipped with a jacket kept at 80° C. and was then washed several times with decane to obtain a solid titanium catalyst component comprising 4.8% by weight of titanium, 14% by weight of magnesium, 57% by weight of chlorine, 2.2% by weight of aluminum and 9.7% by weight of an ethoxy group.

Preparation of benzene-soluble organoaluminum oxy-compound [C]

A 400 ml flask thoroughly purged with nitrogen and charged with 37.1 g of $Al_2(SO_4)_3.14H_2O$ and 133 ml of toluene was cooled to $-5°$ C., followed by dropwise addition of 47.9 ml of trimethylaluminum diluted with 152 ml of toluene over a period of 1 hour. Thereafter, the reaction was carried out at a temperature of from 0° to $-5°$ C. for 1 hour, and the temperature was elevated up to 40° C. over a period of 3 hours, and the reaction was further continued at that temperature for 72 hours. After completion of the reaction, the reaction mixture was subjected to solid-liquid separation by filtration, and the toluene was removed from the filtrate to obtain an organoaluminum oxy-compound as white solids.

Polymerization

A 2 liter stainless steel autoclave thoroughly purged with nitrogen was charged with 600 ml of cyclohexane and 300 ml of 4-methyl-1-pentene, followed by rise in temperature of the system up to 70° C. Into the autoclave, 1 mg atom of the benzene-soluble organoaluminum oxy-compound in terms of Al atom, $5 \times 10^{-4}$ mg atom of the titanium catalyst component [A] in terms of Ti atom prepared in Example 1 and $1.5 \times 10^{-4}$ mmol of bis(cyclopentadienyl)zirconium dichloride together with ethylene were injected to initiate polymerization. The polymerization was carried out at the total pressure of 8 kg/cm²-G and 80° C. for 40 minutes while continuously feeding ethylene to the polymerization system. As the result, there was obtained 65.7 g of an ethylene/4-methyl-1-pentene copolymer having MFR of 0.34 g/10 min, a density of 0.913 g/cm³, an amount of decane-soluble portion at 23° C. of 0.55% by weight and $\overline{M}w/\overline{M}n$ of 11.9.

EXAMPLE 2

Preparation of benzene-insoluble organoaluminum oxy-compound [C]

A 200 ml glass flask thoroughly purged with nitrogen was charged with 36.6 ml of a solution of a benzene-soluble organoaluminum oxy-compound prepared in the same manner as in Example 1 in toluene (Al=2.73 mol/l), 1.69 g of pulverized $Al_2(SO_4)_3.14H_2O$ (passed a 60-mesh screen) and 63.4 ml of toluene, and the contents of the flask were mixed together. The flask was then stirred at 80° C. for 7 hours to obtain a benzene-insoluble organoaluminum compound. The solubility of this compound in benzene kept at 60° as measured was 0.3% by weight.

Polymerization

The polymerization of Example 1 was repeated except that in place of the benzene-soluble organoaluminum oxy-compound, the benzene-insoluble organoaluminum oxy-compound as prepared above was used in an amount of 0.1 mg atom in terms of Al atom, 1 mmol of triisobutylaluminum was further used, the amount of the titanium catalyst component used was changed to $1 \times 10^{-3}$ mg atom and the amount of the zirconium component used was changed to $3 \times 10^{-4}$ mg atom, whereby 49.0 g of an ethylene/4-methyl-1-pentene copolymer having MFR of 0.05 g/10 min, a density of 0.904 g/cm³, an amount of decane-soluble portion at 23° C. of 0.12% by weight and $\overline{M}w/\overline{M}n$ of 7.0 was obtained.

EXAMPLE 3

Preparation of titanium catalyst component [A]

A mixture of 4.8 g of commercially available anhydrous magnesium chloride, 23.1 ml of 2-ethylhexyl alcohol and 27 ml of decane was allowed to undergo reaction by heating for 3 hours at 140° C., whereby a homogeneous solution containing magnesium chloride was obtained. To this solution, 200 ml of decane was added and with stirring at 20° C. 52 ml of a solution of trimethylaluminum in decane (Al=1.0 mol/l) was added dropwise over a period of 30 minutes, followed by reaction for 1 hour at that temperature. Successively, the temperature was elevated to 80° C. over a period of 1 hour, and the reaction was continued further at that temperature for 1 hour. After completion of the reaction, 60 ml of a solution of diethylaluminum chloride in decane (Al=1 mol/l) was added dropwise at 80° C. to the reaction mixture over a period of 30 minutes, and the resulting mixture was then allowed to undergo reaction for 1 hour. After completion of the reaction, the resulting solid portion was separated by filtration. The solid portion thus obtained was suspended again in 200 ml of decane, and thereto 3.75 ml of a solution of 2-ethoxyhexoxy titanium trichloride in decane (Ti=1 mol/l) was added to initiate reaction at 80° C. for 1 hour. The reaction product obtained was the filtered and washed to obtain a solid titanium catalyst component containing 1.3% by weight of titanium, 11% by weight of magnesium, 33% by weight of chlorine, 2.4% by weight of aluminum and 45% by weight of a 2-ethylhexoxy group.

Preparation of zirconium catalyst component

A 400 ml flask thoroughly purged with nitrogen was charged with 3.05 g of silica (F-948, a product of Fuji Davison Co.), which had been calcinated at 700° C. for 6 hours, and 20 ml of decane, and the contents of the flask was brought to a suspension state. To the flask 7.61 ml of a solution of triisobutylaluminum in decane (Al=1 mol/l) was added, followed by stirring at room temperature for 30 minutes. Successively, 23.4 ml of a solution of an organoaluminum oxy-compound prepared in the same manner as in Example 1 in toluene (Al=2.73 mol/l) was added, followed by stirring at room temperature for 30 minutes. Subsequently, 12.8 ml of a solution of bis(cyclopentadienyl)zirconium dichloride in toluene (Zr=0.04 mol/l) was added, followed by stirring for 30 minutes. After a further addition of 100 ml of decane, ethylene gas (ordinary pressure) was continuously introduced into the system to carry out pre-polymerization at 30° C. for 4 hours. The decane was the removed by decantation, and the remaining solid portion was subjected to hot washing (60°) four times with 100 ml of hexane, followed by washing (room temperature) four times with 100 ml of hexane. By virtue of this operation, there was obtained a solid catalyst containing, based on 100 g of silica, $9.5 \times 10^{-3}$ gram atom of Zr and 1.05 gram atom of Al, and 770 g of polyethylene.

Polymerization

A 2-liter stainless steel autoclave thoroughly purged with nitrogen was charged with 150 g of sodium chloride (a special class product of Wako Junyaku K. K.), and vacuum dried at 90° C. for 1 hour. The system was then cooled to 65° C., and thereto, 0.375 mmol of triisobutylaluminum, the titanium catalyst component as prepared above in an amount of $3.75 \times 10^{-3}$ mg atom-Ti and the zirconium catalyst component in an amount of $1.5 \times 10^{-2}$ mg atom Zr were added. Into the system, 500 ml of hydrogen and ethylene at 65° C. were introduced to initiate polymerization at the total pressure of 8 kg/cm$^2$-G. The polymerization was carried out at 80° C. for 1 hour at the total pressure of 8 kg/cm$^2$-G while feeding ethylene thereto. After completion of the polymerization, the sodium chloride was removed by water-washing, and the remaining polymer was washed with methanol and then vacuum dried at 80° C. overnight. As the result, there was obtained 172.0 g of polyethylene having a bulking density of 0.41 g/cm$^3$, MFR of 0.08 g/10 min and $\overline{Mw}/\overline{Mn}$ of 6.5.

COMPARATIVE EXAMPLE 1

Polymerization

The polymerization of Example 1 was repeated except that no titanium catalyst component was used, whereby 58.1 g of an ethylene/4-methyl-1-pentene copolymer having MFR of 1.60 g/10 min, a density of 0.912 g/cm$^3$, an amount of decane-soluble portion at 23° C. of 0.20% by weight and $\overline{Mw}/\overline{Mn}$ of 3.6.

COMPARATIVE EXAMPLE 2

The polymerization of Example 1 was repeated except that no zirconium catalyst component was used but using the titanium catalyst component in an amount of $2 \times 10^{-3}$ mg atom-Ti and hydrogen was introduced at 2 kg/cm$^3$ into the system, whereby 61.5 g of an ethylene/4-methyl-1-pentene copolymer having MFR of 1.30 g/10 min, a density of 0.914 g/cm$^3$, an amount of decane-soluble portion at 23° C. of 11.9% by weight and $\overline{Mw}/\overline{Mn}$ of 7.3.

EXAMPLE 4

Preparation of solid titanium catalyst component [A]

A mixture of 4.8 g of commercially available anhydrous magnesium chloride, 23.1 ml of 2-ethylhexyl alcohol and 27 ml of decane was allowed to undergo reaction by heating for 3 hours at 140° C., whereby a homogeneous solution containing magnesium chloride was obtained. To this solution, 200 ml of decane was added and further with stirring at 20° C., 52 ml of a solution of triethylaluminum in decane (Al=1.0 mol/l) was added dropwise over a period of 30 minutes, followed by reaction for 1 hour. Successively, the temperature of the reaction mixture was elevated to 80° C. over a period of 1 hour, and the reaction was continued further at that temperature for 1 hour. After completion of the reaction, 60 ml of a solution of diethylaluminum chloride in decane (Al=1 mol/l) was added dropwise at 80° C. over a period of 30 minutes, followed by reaction for 1 hour. After completion of the reaction, a solids portion was separated by filtration. The solids portion thus obtained was suspended in 200 ml of decane, and thereto, 3.75 ml of a solution of 2-ethylhexoxytitanium trichloride in decane (Ti=1 mol/l) was added, followed by reaction at 80° C. for 1 hour. Filtration and washing of the reaction product gave a solid titanium catalyst component containing 1.3% by weight of titanium, 11% by weight of magnesium, 33% by weight of chloride, 2.4% by weight of aluminum and 45% by weight of a 2-ethylhexoxy group.

Preparation of organoaluminum oxy-compound [C]

A 400 ml flask thoroughly purged with nitrogen was charged with 37.1 g of Al$_2$(SO$_4$)$_3$ 14H$_2$O and 133 ml of toluene, cooled to −5° C., and 47.9 ml of trimethylaluminum diluted with 152 ml of toluene was added dropwise over a period of 1 hour. After a 1-hour reaction at a temperature of from 0° to −5° C., the temperature was elevated up to 40° C. over a period of 3 hours, and the reaction was further continued at that temperature for 72 hours. After completion of the reaction, the reaction mixture was subjected to solid-liquid separation by filtration, and the toluene was removed from the filtrate, whereby a white solid organoaluminum oxy-compound was obtained.

Pre-polymerization

A 400 ml glass flask thoroughly purged with nitrogen was charged with 20 ml of hexane, 5 ml of a slurry of the solid titanium catalyst [A] in hexane (Ti=0.0338 mol/l), 7.5 ml of a solution of triisobutylaluminum in toluene (Al=1.0 mol/l) and 27.8 ml of a solution of the organoaluminum oxy-compound [C] in toluene (Al=0.9 mol/l), and stirred at room temperature for 10 minutes. To the flask, 10.4 ml of a solution of bis(methylcyclopentadienyl)zirconium dichloride in toluene (Zr=0.048 mol/l) was then added, followed by stirring at room temperature for 15 minutes. Thereafter, 50 ml of hexane was added additionally to the flask, and ethylene was introduced into the system to initiate pre-polymerization. The pre-polymerization was carried out at 25°-30° C. for 5 hours while feeding ethylene continuously under ordinary pressure. After completion of the pre-polymerization, the hexane was removed by decantation from the reaction mixture, and the resulting reaction mixture was washed with hexane to obtain a pre-polymerized catalyst containing 32 g of polyethylene per 1 g of the solid titanium catalyst component [A]. The atomic ratio (Zr/Ti) of zirconium to titanium in this pre-polymerized catalyst was 1.9.

EXAMPLE 5

Pre-polymerization

The pre-polymerization of Example 4 was repeated except that no triisobutylaluminum was used, and the amount of the organoaluminum oxy-compound was changed to 69.5 ml, whereby a pre-polymerized catalyst containing 27 g of polyethylene and having the zirconium/titanium atomic ratio (Zr/Ti) of 1.6 was obtained.

EXAMPLE 6

Pre-polymerization

A 400 ml galss flask thoroughly purged with nitrogen was charged with 35 ml of hexane, 21.1 ml of a slurry of the solid titanium catalyst component [A] in hexane (Ti=0.0338 mol/l), 7.5 ml of a solution of triisobutylaluminium in toluene (Al=1.0 mol/l) and 55.6 ml of a solution of the organoaluminum oxy-compound [C] in toluene (Al=0.9 mol/l), and stirred at room temperature for 25 minutes. To the autoclave, 10.4 ml of a solution of bis(methylcyclopentadienyl)zirconium dichloride in toluene (Zr=0.048 mol/l) was then added, and stirred at room temperature for 5 minutes. The flask was then cherged with 50 ml of hexane, and ethylene was introduced into the system to initiate pre-polymerization. The pre-polymerization was carried out at 25°-30° C. for 5 hours while feeding ethylene continuously into the system under ordinary pressure. After completion of the pre-polymerization, the hexane was removed by decantation from the reaction mixture, and the resulting reaction mixture was washed with hexane to obtain a pre-polymerized catalyst containing 10 g of polyethylene per 1 g of the solid catalyst component [A]. The zirconium/titanium atomic ratio (Zr/Ti) in this pre-polymerized catalyst was 0.45.

EXAMPLE 7

Polymerization

A 2-liter stainless steel autoclave thoroughly purged with nitrogen was charged with 150 g of sodium chloride (a special grade product of Wako Junyaku K. K.), and vacuum dried at 90° C. for 1 hour. The system was then cooled to 65° C., and charged with the organoaluminum oxy-compound in an amount of 0.75 mg in terms of Al atom and the pre-polymerized catalyst as prepared in Example 4 in an amount of $7.8 \times 10^{-3}$ mg atom in terms of Ti atom. Into the autoclave, 1.3 liter of hydrogen and then ethylene were introduced at 65° C., whereby polymerization was initiated under the total pressure of 8 kg/cm$^2$-G. The polymerization was then carried out at 80° C. for 1 hour while feeding ethylene thereinto and maintaining the total pressure at 8 kg/cm$^2$-G. After completion of the polymerization, the sodium chloride was removed by water washing, and the remaining polymer was washed with ethanol, followed by vacuum drying at 80° C. overnight.

As the result, there was obtained 82.0 g of polyethylene having a bulking density of 0.39 g/cm$^3$, MFR of 0.03 g/10 min and $\overline{M}w/\overline{M}n$ of 5.8.

EXAMPLE 8

Polymerization

The polymerization of Example 7 was repeated except that the pre-polymerized catalyst as prepared in Example 5 was used in an amount of $7.5 \times 10^{-3}$ mg atom in terms of Ti atom, whereby 90.5 g of polyethylene having a bulking density of 0.40 g/cm$^3$, MFR of 0.09 g/10 min and $\overline{M}w/\overline{M}n$ of 6.3 was obtained.

EXAMPLE 9

Polymerization

The polymerization of Example 7 was repeated except that the pre-polymerized catalyst as prepared in Example 6 was used in an amount of $3.3 \times 10^{-2}$ mg atom in terms of Ti atom, the amount of hydrogen added was changed to 0.5 liter, and no triisobutylaluminum was used, whereby 211.0 g of polyethylene having a bulking density of 0.42 g/cm$^3$ and MFR of not more than 0.01 g/10 min was obtained.

EXAMPLE 10

Polymerization

A 2-liter stainless steel autoclave thoroughly purged with nitrogen was charged with 150 g of sodium chloride (a special grade product of Wako Junyaku K. K.), and vacuum dried at 90° C. for 1 hour. The system was then cooled to 65° C., and the autoclave was charged with the organoaluminum oxy-compound in an amount of 0.6 mg atom in terms of Al atom and the pre-polymerized catalyst as prepared in Example 4 in an amount of $1 \times 10^{-2}$ mg atom in terms of Ti atom. Into the autoclave, hydrogen at a pressure of 1.5 kg/cm$^2$ and a mixed gas of ethylene and 1-butene (containing 5.8 mol % of 1-butene) at 65° C. were introduced, and polymerization was initiated under the total pressure of 8 kg/cm$^2$-G. The polymerization was then carried out at 80° C. for 40 minutes while feeding the above-mentioned mixed gas into the system and maintaining the total pressure at 8 kg/cm$^2$-G. After completion of the polymerization, the sodium chloride was removed by water washing, and the remaining polymer was washed with methanol, followed by vacuum drying at 80° C. overnight.

As the result, there was obtained 107.6 g of an ethylene/1-butene copolymer having a bulking density of 0.37 g/cm$^3$, MFR of 1.82 g/10 min, a density of 0.925 g/cm$^3$, $\overline{M}w/\overline{M}n$ of 6.0 and an amount of decane-soluble portion of 2.5% by weight.

COMPARATIVE EXAMPLE 3

Pre-polymerization

A 400 ml flask thoroughly purged with nitrogen was charged with 3.05 g of silica (average par 70 μm, specific surface area 260 m$^2$/g, pore volume 1.65 cm$^3$/g), which had been calcinated at 700° C. for 6 hours, and 20 ml of decane, and the contents of the flask were brought to a suspension state. The flask was then charged with 7.61 ml of a solution of triisobutylaluminum in decane (Al=1 mol/l), and stirred at room temperature for 30 minutes, and successively charged with 12.8 ml of a solution of the organoaluminium compound in toluene (Al=1.99 mol/l), followed by stirring at room temperature for 30 minutes. The flask was then charged with 11.0 ml of a solution of bis(methylcyclopentadienyl)zirconium dichloride in toluene (Zr=0.046 mol/l), and stirred for 30 minutes. After the addition of 100 ml of decane, ethylene gas (ordinary pressure) was introduced continuously into the system, whereby pre-polymerization was carried out at 30° C. for 4.5 hours. The decane was then removed by decantation, followed by hot washing (60° C.) four times with hexane and washing (room temperature) for four times with hexane. By virtue of this operation, there was obtained a solid catalyst containing Zr in an amount, based on 100 g of silica, of $12.0 \times 10^{-3}$ gram atom, Al of 0.71 gram atom and 570 g of polyethylene.

Polymerization

The polymerization of Example 7 was repeated except that there were used 2.25 mmol of triisobutylaluminum and the pre-polymerized catalyst as prepared above in an amount of $1.5 \times 10^{-2}$ mg atom in terms of Zr atom, the amount of hydrogen added was changed to 0.2 liter, and polymerization was carried out for 2 hours, whereby 155 g of polyethylene having a bulking density of 0.42 g/cm³, MFR of 0.25 g/10 min and $\overline{Mw}/\overline{Mn}$ of 3.2 was obtained.

EXAMPLE 11

Preparation of solid titanium catalyst component [A]

A 400 ml glass flask charged with 5.1 g of commercially available anhydrous magnesium chloride and 194 ml of decane, was added dropwise with stirring 18.8 ml of ethanol over a period of 10 minutes, followed by stirring at room temperature for 1 hour. In this case, the internal temperature of the system was maintained at 35°-40° C. The flask was then stirred at room temperature for 1 hour. Successively, 70.6 ml of titanium tetrachloride was added dropwise over a period of 30 minutes, and the internal temperature of the system was then elevated to 80° C., followed by stirring at that temperature for 2 hours. The reaction product was filtered with a glass filter equipped with a jacket kept at 80° C., and washed several times with decane to obtain a solid titanium catalyst component containing 4.8% by weight of titanium, 14% by weight of magnesium, 57% by weight of chlorine, 2.2% by weight of aluminum and 9.7% by weight of an ethoxy group.

Preparation of zirconium catalyst component [B]

A suspension of 0.65 g of tri(n-butyl)ammonium tetra(p-tolyl)borate in 50 ml of toluene, was added 0.50 g of bis(pentamethylcyclopentadienyl)dimethyl zirconium, followed by stirring at room temperature for 1 hour. After removal of parts of the toluene by distillation, the filtration was performed to obtain solids. The solids were washed with pentene and vacuum dried to obtain the zirconium catalyst component [B].

Preparation of organoaluminum oxy-compound [C]

A 400 ml flask thoroughly purged with nitrogen was charged with 37.1 g of $Al_2(SO_4)_3 \cdot 14H_2O$ and 133 ml of toluene, and cooled to $-5°$ C. To the flask, 47.9 ml of trimethylaluminum diluted with 152 ml of toluene was then added dropwise over a period of 1 hour. After a 1-hour reaction at a temperature of from 0° to $-5°$ C., the temperature as elevated up to 40° C. over a period of 3 hours, and the reaction was continued further for 72 hours at that temperature. After completion of the reaction, the reaction mixture was subjected to solid-liquid separation by filtration, and the toluene was removed from the filtrate to obtain a white solid organoaluminum oxy-compound.

Polymerization

A 2-liter stainless steel autoclave thoroughly purged with nitrogen was charged with 600 ml of cyclohexane and 300 ml of 4-methyl-1-pentene, and the internal temperature of the system was elevated to 70° C. Into the autoclave, 1 mg atom-Al of organoaluminum oxy-compound [C], $1 \times 10^{-3}$ mg atom-Ti of the titanium catalyst component [A] and 0.1 mg atom-Zr of the zirconium catalyst component [B] was then injected together with ethylene, thereby initiating polymerization. The polymerization was carried out at 80° C. and the total pressure of 8 kg/cm²-G for 40 minutes while feeding ethylene continuously. As the result, there was obtained 54.2 g of an ethylene/4-methyl-1-pentene copolymer having MFR of 0.03 g/10 min, a density of 0.913 g/cm³, $\overline{Mw}/\overline{Mn}$ of 9.8 and an amount of cane-soluble portion of 0.31% by weight.

EXAMPLE 12

Preparation of zirconium catalyst component [B]

Example 11 was repeated except that in place of the bis(pentamethylcyclopentadienyl)dimethyl zirconium, there was used 0.32 g of bis(cyclopentadienyl)dimethyl zirconium, whereby the title zirconium catalyst component was obtained.

Polymerization

The polymerization of Example 11 was repeated except that the amount of the titanium catalyst component used was changed to $5 \times 10^{-4}$ mg atom, and there was used as the zirconium catalyst component the zirconium catalyst component as prepared above was used in an amount of $6 \times 10^{-3}$ mg atom-Zr, whereby 48.9 g of an ethylene/4-methyl-1-pentene copolymer having MFR of 0.59 g/10 min, a density of 0.913 g/cm³, $\overline{Mw}/\overline{Mn}$ of 10.9 and an amount of decane-soluble portion 1.0% by weight.

COMPARATIVE EXAMPLE 4

The polymerization of Example 12 was repeated except that no zirconium catalyst component was used, the titanium catalyst component was used in an amount of $2 \times 10^{-3}$ mg atom-Ti and hydrogen was introduced at a pressure 2 kg/cm², whereby 61.5 g of an ethylene/4-methyl-1-pentene copolymer having MFR of 1.30 g/10 min, a density of 0.914 g/cm³, an amount of decane-soluble portion of 11.9% by weight and $\overline{Mw}/\overline{Mn}$ of 7.3.

COMPARATIVE EXAMPLE 5

The polymerization of Example 12 was repeated except that no titanium catalyst component was used, and there was used the zirconium catalyst component in an amount of $1 \times 10^{-2}$ mg atom-Zr, whereby 50.5 g of an ethylene/4-methyl-1-pentene copolymer having MFR of 7.9 g/10 min, a density of 0.912 g/cm³, an amount of decane-soluble portion of 2.0% by weight and $\overline{Mw}/\overline{Mn}$ of 3.5 was obtained.

What is claimed is:

1. An olefin polymerization catalyst formed by pre-polymerization of olefin in a suspension in an amount of 0.1-500 g per 1 g of a catalyst containing
   (A) a solid titanium catalyst component prepared by contacting titanium compound with halogen containing magnesium compound,
   (B-1) a transition metal compound having formula MLx wherein M is a transition metal selected from the group consisting of zirconium, titanium, hafnium, chromium and vanadium, L is a ligand coordinating to the transition metal, at least one of L is a ligand having a cycloalkadienyl skeleton, and when at least two or more ligands having a cycloalkadienyl skeleton are contained, at least two ligands having cycloalkadienyl skeleton may be linked together via lower alkylene, substituted alkylene, silylene or substituted silylene, L other than the ligand having a cycloalkadienyl skeleton is hydrocarbon group of 1-12 carbon atoms, alkoxy of 1-12 carbon atoms, aryloxy, halogen or hydrogen, and x is a valence of the transition metal, and
   (C) an aluminoxane.

2. An olefin polymerization catalyst formed by pre-polymerization of olefin is a suspension in an amount of 0.1-500 g per 1 g of a catalyst containing
   (A) a solid titanium catalyst component prepared by contacting titanium compound with halogen containing magnesium compound,
   (B-1) a transition metal compound having formula Mlx wherein M is a transition metal selected from the group consisting of zirconium, titanium, hafnium, chromium and vanadium, L is a ligand coordinating to the transition metal, at least one of L is a ligand having a cycloalkadienyl skeleton, and when at least two or more ligands having a cycloalkadienyl skeleton are contained, at least two ligands having cycloalkadienyl skeleton may be linked together via lower alkylene, substituted alkylene, silylene or substituted silylene, L other than the ligand having a cycloalkadienyl skeleton is hydrocarbon group of 1-12 carbon atoms, alkoxy of 1-12 carbon atoms, aryloxy, halogen or hydrogen, and x is a valence of the transition metal,
   (C) an aluminoxane, and
   (D) an organoaluminum compound.

3. An olefin polymerization catalyst comprising
   (I) a solid catalyst formed by pre-polymerization of olefin in a suspension in an amount of 0.1-500 g per 1 g of a catalyst containing
       (A) a solid titanium catalyst component prepared by contacting titanium compound with halogen containing magnesium compound,
       (B-1) a transition metal compound having formula Mlx wherein M is a transition metal selected from the group consisting of zirconium, titanium, hafnium, chromium and vanadium, L is a ligand coordinating to the transition metal, at least one of L is a ligand having a cycloalkadienyl skeleton, and when at least two or more ligands having a cycloalkadienyl skeleton are contained, at least two ligands having cycloalkadienyl skeleton may be linked together via lower alkylene, substituted alkylene, silylene or substituted silylene, L other than the ligand having a cycloalkadienyl skeleton is hydrocarbon group of 1-12 carbon atoms, alkoxy of 1-12 carbon atoms, aryloxy, halogen or hydrogen, and x is a valence of the transition metal, and
       (C) an aluminoxane; and
   (II) (C) an aluminoxane and/or (D) an organoaluminum compound.

4. An olefin polymerization catalyst comprising
   (I) a solid catalyst formed by pre-polymerization of olefin in a suspension in an amount of 0.1-500 g per 1 g of a catalyst containing
       (A) a solid titanium catalyst component prepared by containing titanium compound with halogen containing magnesium compound,
       (B-1) a transition metal compound having formula MLx wherein M is a transition metal selected from the group consisting of zirconium, titanium, hafnium, chromium and vanadium, L s a ligand coordinating to the transition metal, at least one of L is a ligand having a cycloalkadienyl skeleton, and when at least two or more ligands having a cycloalkadienyl skeleton are contained, at least two ligands having cycloalkadienyl skeleton may be linked together via lower alkylene, substituted alkylene, silylene or substituted silylene, L other than the ligand having a cycloalkadienyl skeleton is hydrocarbon group of 1-12 carbon atoms, alkoxy of 1-12 carbon atoms, aryloxy, halogen or hydrogen, and x is a valence of the transition metal,
       (C) an aluminoxane, and
       (D) an organoaluminum compound; and
   II. (C) an aluminoxane and/or (D) an organoaluminum compound.

5. An olefin polymerization catalyst formed by pre-polymerization of olefin in a suspension in an amount of 0.1-500 g per 1 g of a catalyst containing
   (A) a solid titanium catalyst component prepared by contacting titanium compound with halogen containing magnesium compound,
   (B-1) a contact reaction product of (B-1) a transition metal compound having formula MLx where M is a transition metal selected from the group consisting of zirconium, titanium, hafnium, chromium and vanadium, L is a ligand coordinating to the transition metal, at least one of L is a ligand having a cycloalkadienyl skeleton, and when at least two or more ligands having a cycloalkadienyl skeleton are contained, at least two ligands having cycloalkadienyl skeleton may be linked together via lower alkylene, substituted alkylene, silylene or substituted silylene, L other than the ligand having a cycloalkadienyl skeleton is hydrocarbon group of 1-12 carbon atoms, alkoxy of 1-12 carbon atoms, aryloxy, halogen or hydrogen, and x is a valence of the transition metal,
   (B-b) Brønsted acid or proton, and
   (B-c) an anion compound containing boron, and at least one member selected from the group consisting of (C) aluminoxane and (D) organoaluminum compound.

6. An olefin polymerization catalyst comprising
   (I) a solid catalyst component formed by pre-polymerization of olefin in a suspension in an amount of 0.1-500 g per 1 g of a catalyst containing
       (A) a solid titanium catalyst component prepared by contacting titanium compound with halogen containing magnesium compound,
       (B-2) a contact reaction product of (B-1) a transition metal compound having formula MLx wherein M is a transition metal selected from the group consisting of zirconium, titanium, hafnium, chromium and vanadium, L is a ligand coordinating to the transition metal, at least one of L is a ligand having a cycloalkadienyl skeleton, and when at least two or more ligands having a cycloalkadienyl skeleton are contained, at least two ligands having cycloalkadienyl skeleton may be linked together via lower alkylene, substituted, alkylene, silylene or substituted silylene, L other than the ligand having a cycloalkadienyl skeleton is hydrocarbon group of 1-12 carbon atoms, alkoxy of 1-12 carbon atoms, aryloxy, halogen or hydrogen, and x is a valence of the transition metal, (B-b) Brønsted acid or proton, and (B-c) an anion compound containing boron, and at least one member selected from the group consisting of (C) aluminoxane and (D) organoaluminum compound, and (II) (C) an aluminoxane and/or (D) an organoaluminum compound.

* * * * *